United States Patent
Nakakura

(10) Patent No.: US 9,267,560 B2
(45) Date of Patent: Feb. 23, 2016

(54) BICYCLE DISC BRAKE ROTOR ASSEMBLY AND BICYCLE DISC BRAKE ROTOR

(71) Applicant: SHIMANO INC., Sakai (JP)

(72) Inventor: Masahiro Nakakura, Sakai (JP)

(73) Assignee: SHIMANO INC., Sakai (JP)

( * ) Notice: Subject to any disclaimer, the term of this patent is extended or adjusted under 35 U.S.C. 154(b) by 61 days.

(21) Appl. No.: 13/956,268

(22) Filed: Jul. 31, 2013

(65) Prior Publication Data
US 2015/0034430 A1 Feb. 5, 2015

(51) Int. Cl.
| F16D 65/12 | (2006.01) |
| B62L 3/02 | (2006.01) |
| F16D 65/02 | (2006.01) |
| F16D 69/00 | (2006.01) |

(52) U.S. Cl.
CPC ............... *F16D 65/123* (2013.01); *B62L 3/023* (2013.01); *F16D 65/12* (2013.01); *F16D 2065/1316* (2013.01); *F16D 2065/1356* (2013.01); *F16D 2065/1392* (2013.01); *F16D 2069/004* (2013.01)

(58) Field of Classification Search
CPC .......... F16D 65/123; F16D 2065/1368; F16D 2065/1364; F16D 2065/1356; F16D 2065/1384
USPC .................................................... 188/218 XL
See application file for complete search history.

(56) References Cited

U.S. PATENT DOCUMENTS

| 4,303,149 | A | * | 12/1981 | Lech, Jr. ..................... 192/70.19 |
| 5,570,760 | A | * | 11/1996 | Lai ................................... 188/26 |
| 6,123,179 | A | * | 9/2000 | Chen ............................... 192/64 |
| 6,206,144 | B1 | * | 3/2001 | Di Bella .......................... 188/26 |
| 6,244,405 | B1 | * | 6/2001 | Chen ................................ 192/64 |
| 6,336,531 | B1 | * | 1/2002 | Chou ....................... 188/218 XL |
| 6,371,252 | B1 | * | 4/2002 | Kanehisa ......................... 188/26 |
| 6,854,569 | B2 | * | 2/2005 | Chen ................................ 188/26 |
| 6,964,323 | B2 | * | 11/2005 | Campbell ................... 188/18 A |
| 7,044,272 | B2 | * | 5/2006 | Takizawa ........................ 188/26 |
| 7,441,842 | B2 | * | 10/2008 | Watarai et al. ............. 301/110.5 |
| 7,475,758 | B2 | * | 1/2009 | Dimsey et al. ................. 188/26 |
| 2005/0139432 | A1 | | 6/2005 | Takizawa |
| 2005/0199452 | A1 | * | 9/2005 | Ward .................... F16D 55/224 188/71.7 |
| 2006/0213737 | A1 | * | 9/2006 | Black, Jr. ................ F16D 65/42 192/13 R |
| 2011/0068555 | A1 | * | 3/2011 | Hoag ..................... B62B 7/126 280/283 |

FOREIGN PATENT DOCUMENTS

DE 60 2004 011 887 T2 2/2009

OTHER PUBLICATIONS

German Search Report for corresponding DE Application No. 10 2014 011 353.1, Jul. 13, 2015.

* cited by examiner

*Primary Examiner* — Robert A Siconolfi
*Assistant Examiner* — James Hsiao
(74) *Attorney, Agent, or Firm* — Mori & Ward, LLP

(57) ABSTRACT

A bicycle disc brake rotor assembly comprises a hub axle, a hub shell, a disc brake rotor, and a positioning mechanism. The hub axle extends in an axial direction. The hub shell is configured to rotate around the hub axle. The disc brake rotor is configured to be adjustably attached to the hub shell in the axial direction. The positioning mechanism is configured to position the disc brake rotor in the axial direction at an adjusted position.

24 Claims, 22 Drawing Sheets

BICYCLE DISC BRAKE ROTOR ASSEMBLY AND BICYCLE DISC BRAKE ROTOR

BACKGROUND OF THE INVENTION

1. Field of the Invention

The present invention relates to a bicycle disc brake rotor assembly and a bicycle disc brake rotor.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In recent years, some bicycles have been provided with a bicycle disc brake system. The bicycle disc brake system includes a bicycle disc brake caliper and a bicycle disc brake rotor assembly, for example.

SUMMARY OF THE INVENTION

In accordance with a first aspect of the present invention, a bicycle disc brake rotor assembly comprises a hub axle, a hub shell, a disc brake rotor, and a positioning mechanism. The hub axle extends in an axial direction. The hub shell is configured to rotate around the hub axle. The disc brake rotor is configured to be adjustably attached to the hub shell in the axial direction. The positioning mechanism is configured to position the disc brake rotor in the axial direction at an adjusted position.

In accordance with a second aspect of the present invention, the bicycle disc brake rotor assembly according to the first aspect is configured so that the hub shell extends in the axial direction. The hub shell includes a first end portion having an outer serration portion provided on an outer circumferential surface of the first end portion. The disc brake rotor includes an inner serration portion defining an attachment opening. The inner serration portion of the disc brake rotor is configured to mesh with the outer serration portion of the hub shell such that the hub shell and the disc brake rotor are integrally rotatable in a circumferential direction of the disc brake rotor and are relatively movable in the axial direction.

In accordance with a third aspect of the present invention, the bicycle disc brake rotor assembly according to the second aspect is configured so that the positioning mechanism includes an adjusting member configured to be attached to the first end portion of the hub shell.

In accordance with a fourth aspect of the present invention, the bicycle disc brake rotor assembly according to the third aspect is configured so that the hub shell further includes a threaded hole at the first end portion. The adjusting member includes a flange portion and a tubular portion. The flange portion is configured to contact the disc brake rotor. The tubular portion protrudes from the flange portion in the axial direction and includes an external thread configured to be screwed in the threaded hole such that the flange portion is rotatable with respect to the hub shell.

In accordance with a fifth aspect of the present invention, the bicycle disc brake rotor assembly according to the fourth aspect is configured so that the positioning mechanism further includes a biasing member configured to bias the disc brake rotor toward the flange portion.

In accordance with a sixth aspect of the present invention, the bicycle disc brake rotor assembly according to the fifth aspect is configured so that the biasing member comprises one of a coil spring, a wave spring, and a disc spring.

In accordance with a seventh aspect of the present invention, the bicycle disc brake rotor assembly according to the fifth aspect is configured so that the first end portion further has a hub flange portion protruding radially outward with respect to the hub axle. The biasing member is provided between the disc brake rotor and the hub flange portion.

In accordance with an eighth aspect of the present invention, the bicycle disc brake rotor assembly according to the seventh aspect is configured so that the positioning mechanism is configured to adjust an inner diameter of the attachment opening to position the disc brake rotor at the adjusted position.

In accordance with a ninth aspect of the present invention, the bicycle disc brake rotor assembly according to the eighth aspect is configured so that the disc brake rotor further includes an annular attachment portion and an arm portion. The annular attachment portion has the inner serration portion defining the attachment opening. The arm portion protrudes radially outward from the annular attachment portion. The slit is provided at the arm portion and the annular attachment portion so as to connect with the attachment opening and at least partially divide the arm portion to a first portion and a second portion. The positioning mechanism is configured to change a width of the slit to adjust the inner diameter of the attachment opening.

In accordance with a tenth aspect of the present invention, the bicycle disc brake rotor assembly according to the ninth aspect is configured so that the first portion includes a through-hole extending in a predetermined direction which is non-parallel to a radial direction of the disc brake rotor. The second portion includes an inner thread extending in the predetermined direction. The positioning mechanism comprises an adjusting bolt. The adjusting bolt includes a shaft portion and a head portion. The shaft portion has an external thread and is configured to be inserted in the through-hole of the first portion. The external thread is configured to be screwed in the inner thread of the second portion. The head portion is provided at an end of the shaft portion and has an outer diameter larger than an inner diameter of the through-hole of the first portion. The head portion is provided on an opposite side of the second portion with respect to the first portion to contact the first portion.

In accordance with an eleventh aspect of the present invention, the bicycle disc brake rotor assembly according to the second aspect is configured so that the positioning mechanism is configured to adjust an inner diameter of the attachment opening to position the disc brake rotor at the adjusted position.

In accordance with a twelfth aspect of the present invention, the bicycle disc brake rotor assembly according to the eleventh aspect is configured so that the disc brake rotor further includes an annular attachment portion, an arm portion, and a slit. The annular attachment portion has the inner serration portion defining the attachment opening. The arm portion protrudes radially outward from the annular attachment portion. The slit is provided at the arm portion and the annular attachment portion so as to connect with the attachment opening and at least partially divide the arm portion to a first portion and a second portion. The positioning mechanism is configured to change a width of the slit to adjust the inner diameter of the attachment opening.

In accordance with a thirteenth aspect of the present invention, the bicycle disc brake rotor assembly according to the twelfth aspect is configured so that the first portion includes a through-hole extending in a predetermined direction which is non-parallel to a radial direction of the disc brake rotor. The second portion includes an inner thread extending in the predetermined direction. The positioning mechanism comprises an adjusting bolt. The adjusting bolt includes a shaft portion and a head portion. The shaft portion has an external thread and is configured to be inserted in the through-hole of the first portion. The external thread is configured to be screwed in the inner thread of the second portion. The head portion is provided at an end of the shaft portion and has an outer diameter larger than an inner diameter of the through-hole of the first portion. The head portion is provided on an opposite side of the second portion with respect to the first portion to contact the first portion.

In accordance with a fourteenth aspect of the present invention, a bicycle disc brake rotor comprises an annular attachment portion, an arm portion, a slit, and a positioning mechanism. The annular attachment portion has an inner serration portion defining an attachment opening. The arm portion protrudes radially outward from the annular attachment portion. The slit is provided at the arm portion and the annular attachment portion so as to connect with the attachment opening and at least partially divide the arm portion to a first portion and a second portion. The positioning mechanism is configured to change a width of the slit to adjust an inner diameter of the attachment opening.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
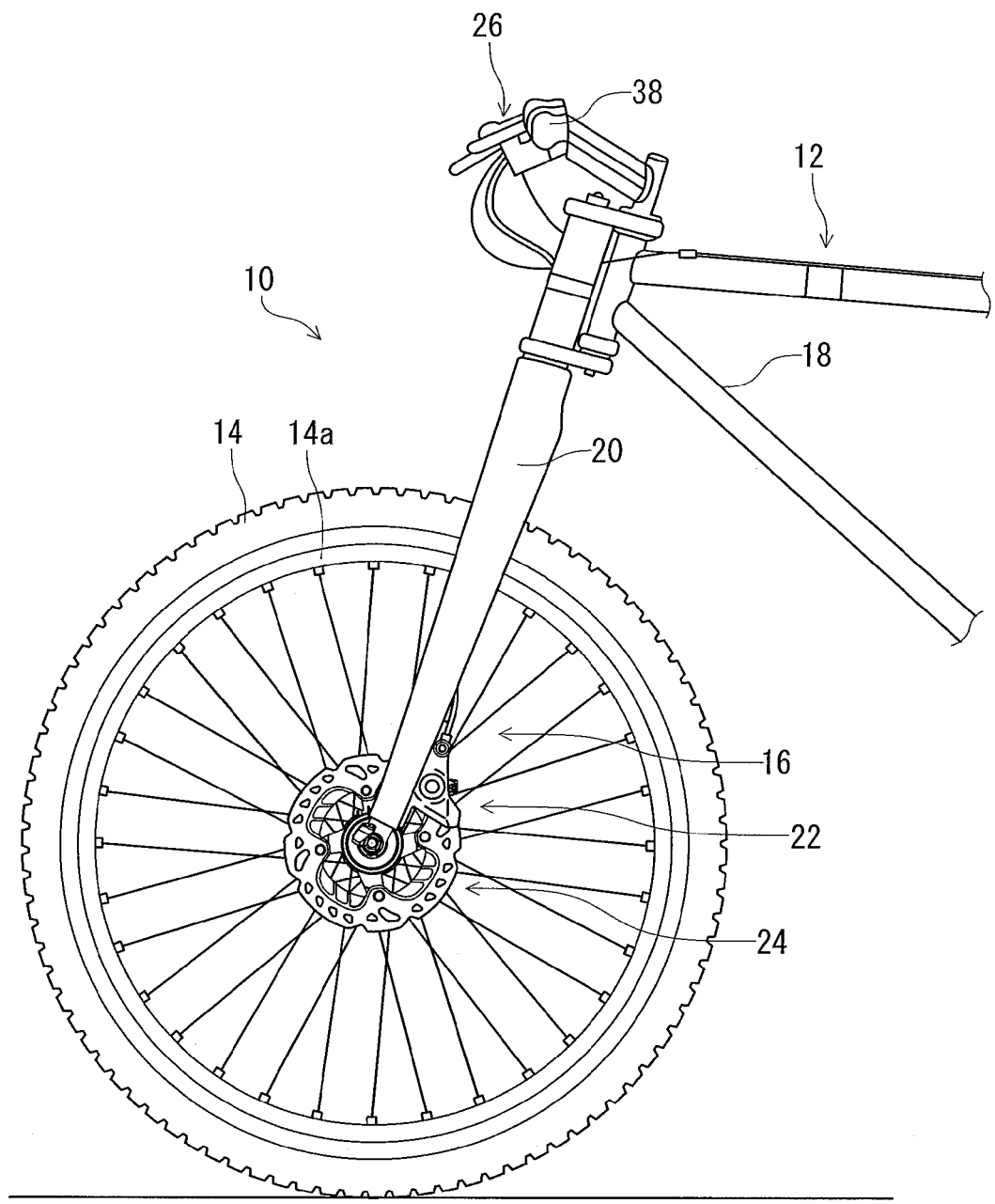
FIG. 1 is a left side elevational view of a front portion of a bicycle with a bicycle disc brake rotor assembly in accordance with a first embodiment of the present invention.

The embodiments will now be described with reference to the accompanying drawings, wherein like reference numerals designate corresponding or identical elements throughout the various drawings.

First Embodiment

Referring initially to FIG. 1, a bicycle 10 includes a bicycle frame 12, a front wheel 14, a rear wheel (not shown), a drive train (not shown), and a bicycle disc brake device 16. The bicycle frame 12 includes a main frame 18 and a front fork 20. The front wheel 14 is rotatably supported by the front fork 20. The rear wheel is rotatably supported by a rear end of the main frame 18. The bicycle disc brake device 16 includes a brake caliper assembly 22, a bicycle disc brake rotor assembly 24, and a brake operating mechanism 26. In the first embodiment, the following directional terms "front", "rear", "forward", "rearward", "left", "right", "upward" and "downward" as well as any other similar directional terms refer to those directions which are determined on the basis of the rider who sits on a saddle (not shown) of the bicycle 10 with facing a handlebar 38. Accordingly, these terms, as utilized to describe the bicycle disc brake rotor assembly 24 should be interpreted relative to the bicycle 10 equipped with the bicycle disc brake rotor assembly 24 as used in an upright riding position on a horizontal surface. These definitions can be applied to other embodiments.

Figure 2:
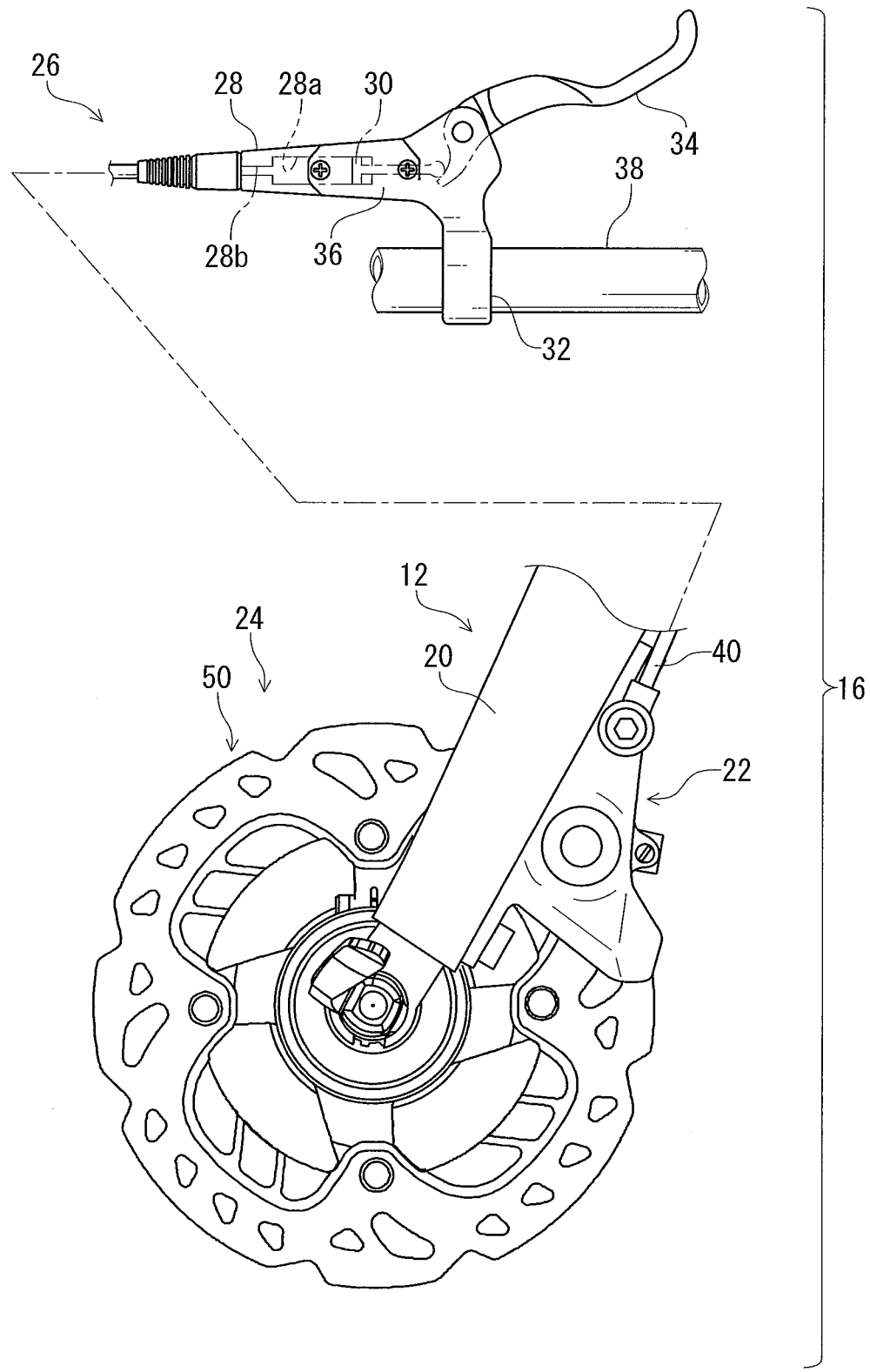
FIG. 2 is a partial side elevational view of a bicycle disc brake device with the bicycle disc brake rotor assembly in accordance with the first embodiment.

Referring to FIG. 2, the brake caliper assembly 22 is mounted to the front fork 20 of the bicycle frame 12. It will be apparent to those skilled in the bicycle field that the brake caliper assembly 22 can be mounted to the main frame 18 for the rear wheel. The brake operating mechanism 26 is configured to actuate the brake caliper assembly 22 to apply a braking force on a disc brake rotor 50 of the bicycle disc brake rotor assembly 24.

As illustrated in FIG. 2, the brake operating mechanism 26 includes a master cylinder 28, a master piston 30, a clamp 32, a brake lever 34, and a hydraulic fluid reservoir 36. The brake operating mechanism 26 is mounted on the handlebar 38 via the clamp 32. The master cylinder 28 includes a master cylinder bore 28a in which the master piston 30 is movably disposed. The brake lever 34 is pivotally coupled to the master cylinder 28 for operating the brake caliper assembly 22. The brake lever 34 is operatively coupled to the master piston 30 such that the master piston 30 is movable in the master cylinder bore 28a in response to the pivotal movement of the brake lever 34. The hydraulic fluid reservoir 36 is in fluid communication with the master cylinder bore 28a. The master cylinder 28 and the hydraulic fluid reservoir 36 contain hydraulic fluid such as mineral oil. The master cylinder 28 has an outlet port 28b for supplying hydraulic fluid to the brake caliper assembly 22 via a hydraulic brake hose 40.

Figure 3:
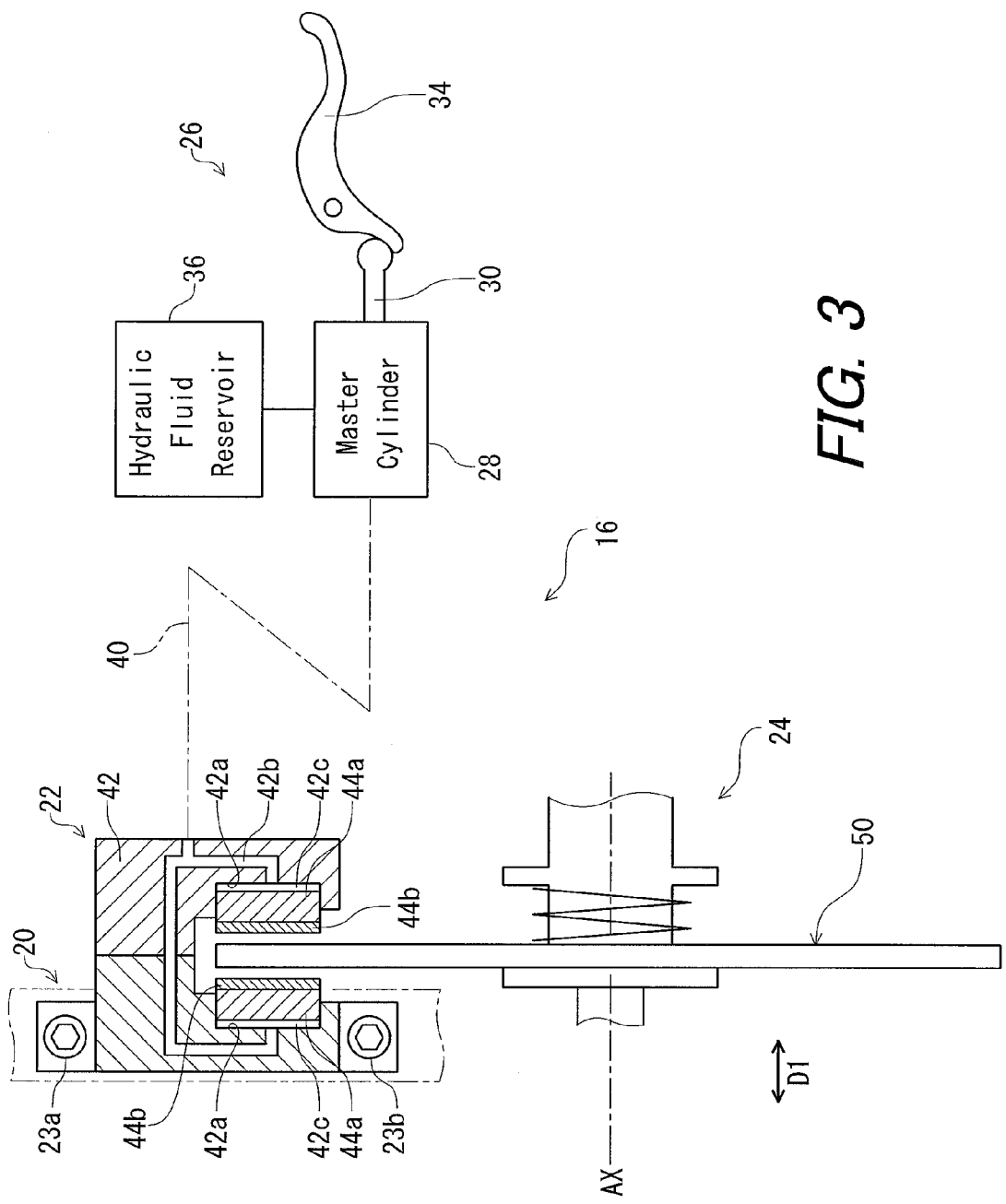
FIG. 3 is a schematic structural diagram of the bicycle disc brake device illustrated in FIG. 2.

Referring to FIG. 3, the brake caliper assembly 22 is attached to the front fork 20 by bolts 23a and 23b. The brake caliper assembly 22 is configured to apply a braking force on the disc brake rotor 50 of the bicycle disc brake rotor assembly 24. The brake caliper assembly 22 includes a housing 42, a pair of pistons 44a, and a pair of brake pads 44b. The pistons 44a are arranged to press the brake pads 44b toward the disc brake rotor 50 respectively. The housing 42 includes a pair of cylinders 42a and a caliper fluid passage 42b. The pistons 44a are disposed within the cylinders 42a to be movable in an axial direction D1 of the disc brake rotor 50 respectively. The fluid chambers 42c are defined by the pistons 44a and the cylinders 42a. The fluid chambers 42c are in fluid communication with the caliper fluid passage 42b. The caliper fluid passage 42b is in fluid communication with the master cylinder 28 via the hydraulic brake hose 40.

When the brake lever 34 is operated, the master piston 30 moves within the master cylinder 28 in response to the pivotal movement of the brake lever 34, which allows the hydraulic fluid to move through the hydraulic brake hose 40 connected to the brake caliper assembly 22. The hydraulic fluid moves the pistons 44a to press the brake pads 44b against the bicycle disc brake rotor assembly 24, applying the braking force to the bicycle disc brake rotor assembly 24.

To substantially equally press the brake pads 44b against the disc brake rotor 50 of the bicycle disc brake rotor assembly 24, the disc brake rotor 50 is preferably located at a substantially center position between the brake pads 44b in the axial direction D1 of the bicycle disc brake rotor assembly 24. Accordingly, the bicycle disc brake rotor assembly 24 is so configured that a position of the disc brake rotor 50 can be adjusted in the axial direction D1 relative to the brake caliper assembly 22 attached to the front fork 20.

Figure 4:
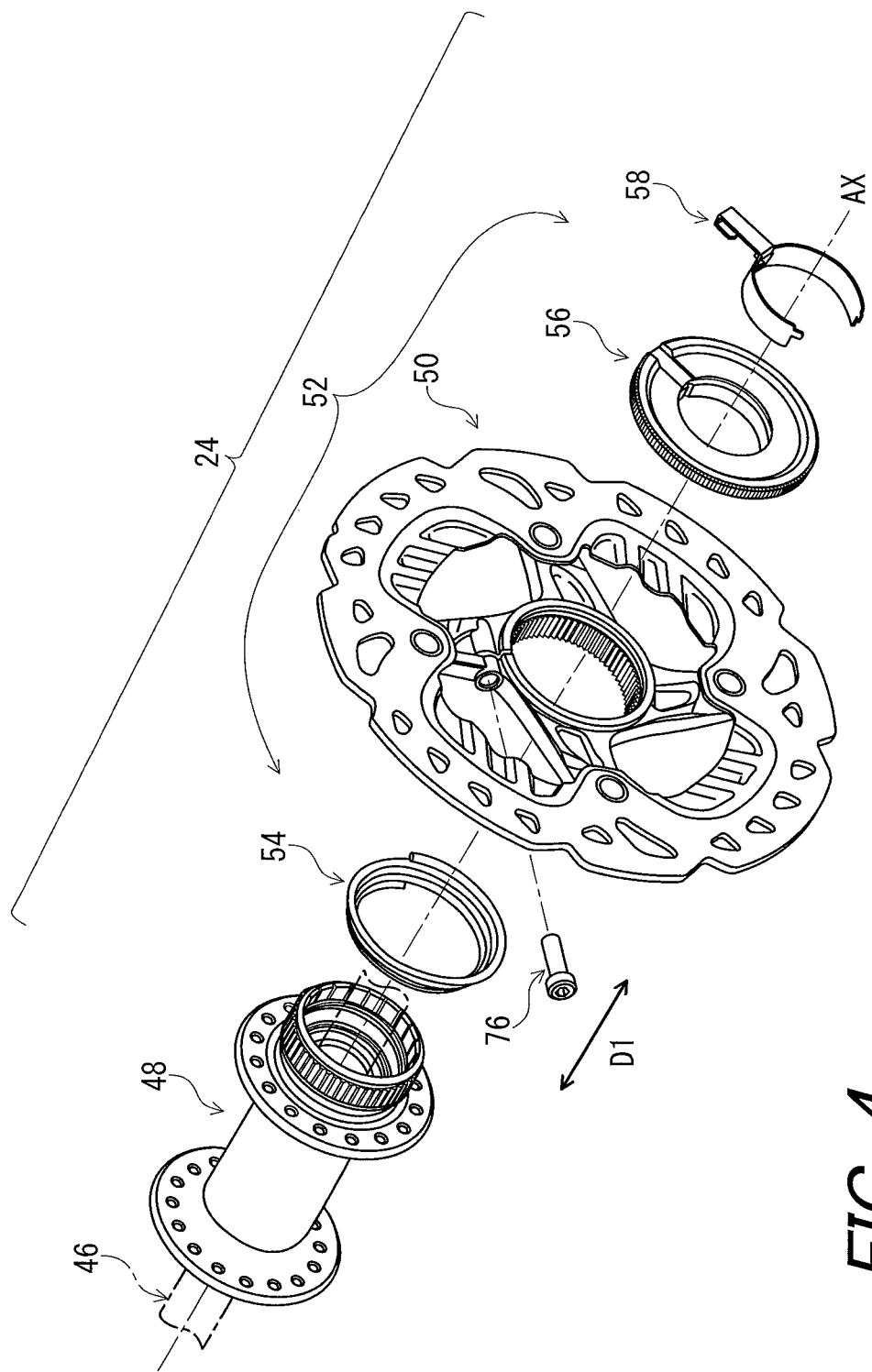
FIG. 4 is an exploded perspective view of the bicycle disc brake rotor assembly illustrated in FIG. 3.

As illustrated in FIG. 4, the bicycle disc brake rotor assembly 24 is included in the wheel 14 and comprises a hub axle 46, a hub shell 48, the disc brake rotor 50, and a positioning mechanism 52. The hub axle 46 extends in the axial direction D1 and is configured to be attached to the front fork 20 of the bicycle frame 12. The axial direction D1 is defined along a rotational axis AX of the bicycle disc brake rotor assembly 24. The hub shell 48 is configured to rotate around the hub axle 46. More specifically, the hub shell 48 is configured to be rotatably mounted to the hub axle 46 about the rotational axis AX. The hub axle 46 and hub shell 48 are configured to rotatably attach the front wheel 14 (FIG. 1) to the front fork 20. The disc brake rotor 50 is attached to the hub shell 48 to be rotatable integrally with the hub shell 48 about the rotational axis AX. Furthermore, the disc brake rotor 50 is configured to be adjustably attached to the hub shell 48 in the axial direction D1. More specifically, the disc brake rotor 50 is configured to be attached to the hub shell 48 so that the position of the disc brake rotor 50 is adjustable relative to the hub shell 48 in the axial direction D1. The positioning mechanism 52 is configured to position the disc brake rotor 50 in the axial direction D1 at an adjusted position. To position the disc brake rotor 50 at the adjusted position, the positioning mechanism 52 includes a biasing member 54, an adjusting member 56, and a lock member 58. The biasing member 54 is configured to bias the disc brake rotor 50 toward the adjusting member 56. The adjusting member 56 is configured to be attached to the hub shell 48. The lock member 58 is configured to be attached to the adjusting member 56. The disc brake rotor 50 and the positioning mechanism 52 will be described in detail later.

Figure 5:
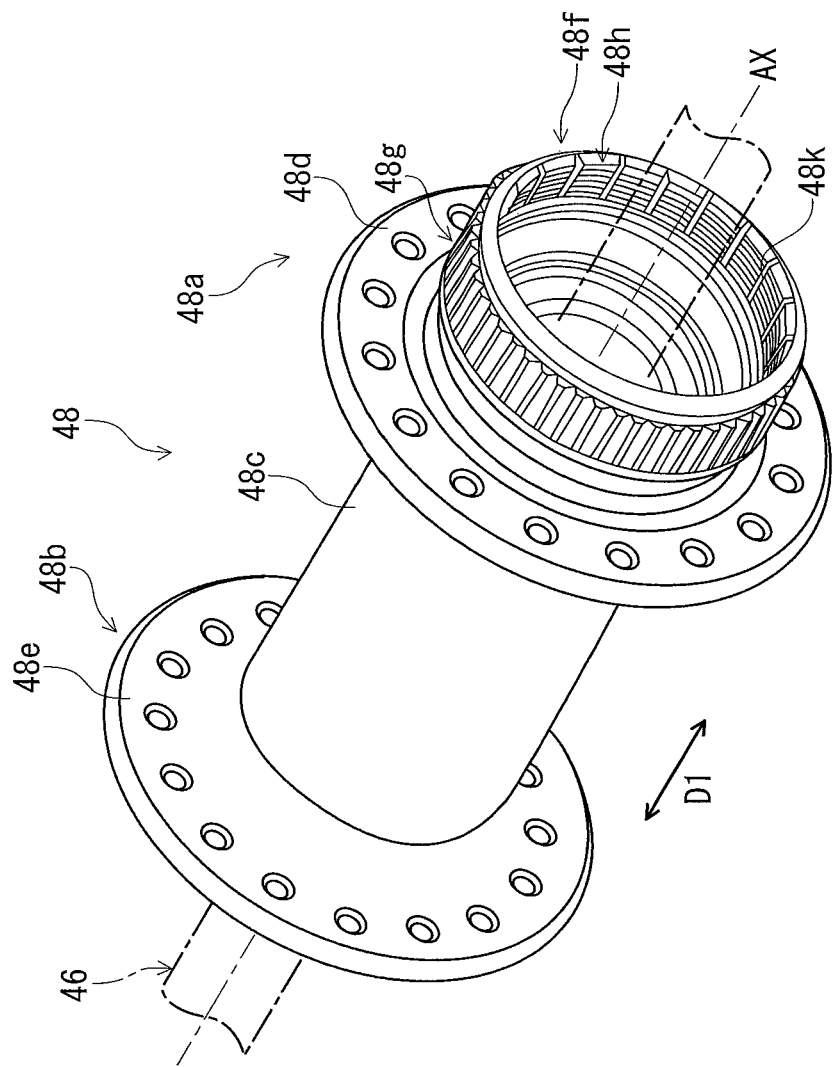
FIG. 5 is a perspective view of a hub shell provided in the bicycle disc brake rotor assembly illustrated in FIG. 4.

As illustrated in FIG. 5, the hub shell 48 is a substantially tubular member and is preferably made of metallic material such as aluminum alloy or stainless steel. The hub shell 48 extends in the axial direction D1. The hub shell 48 includes a first end portion 48a, a second end portion 48b opposite to the first end portion 48a in the axial direction D1, and a center tubular portion 48c. In the illustrated embodiment, the first end portion 48a, the second end portion 48b and the center tubular portion 48c are integrally provided as a one-piece unitary member. The center tubular portion 48c has a tubular shape and extends in the axial direction D1 between the first end portion 48a and the second end portion 48b. The first end portion 48a has a hub flange portion 48d and the second end portion 48b has a hub flange portions 48e. The hub flange portions 48d and 48e protrude radially outward with respect to the hub axle 46. The hub flange portions 48d and 48e are configured to be connected to a rim 14a of the front wheel 14 (FIG. 1) via spokes so that the front wheel 14 is rotatable about the hub axle 46. The hub flange portion 48d is further configured to contact the biasing member 54 (FIG. 4) to receive the elastic force from the biasing member 54.

As illustrated in FIG. 5, the first end portion 48a further has an end tubular portion 48f, an outer serration portion 48g, a threaded hole 48h, and lock grooves 48k. The end tubular portion 48f is arranged at an opposite side of the center tumbler portion 48c with respect to the hub flange 48d. The end tubular portion 48f extends from the hub flange 48d in the axial direction D1. The outer serration portion 48g is provided on an outer circumferential surface of the end tubular portion 48f. The threaded hole 48h is provided at the first end portion 48a and is provided on an inner circumferential surface of the end tubular portion 48f. The lock grooves 48k are provided on the inner circumferential surface of the end tubular portion 48f to restrict the relative rotation between the hub shell 48 and the lock member 58. The lock grooves 48k extends in the axial direction D1 and are substantially equally spaced apart in a circumferential direction of the hub shell 48.

Figure 6:
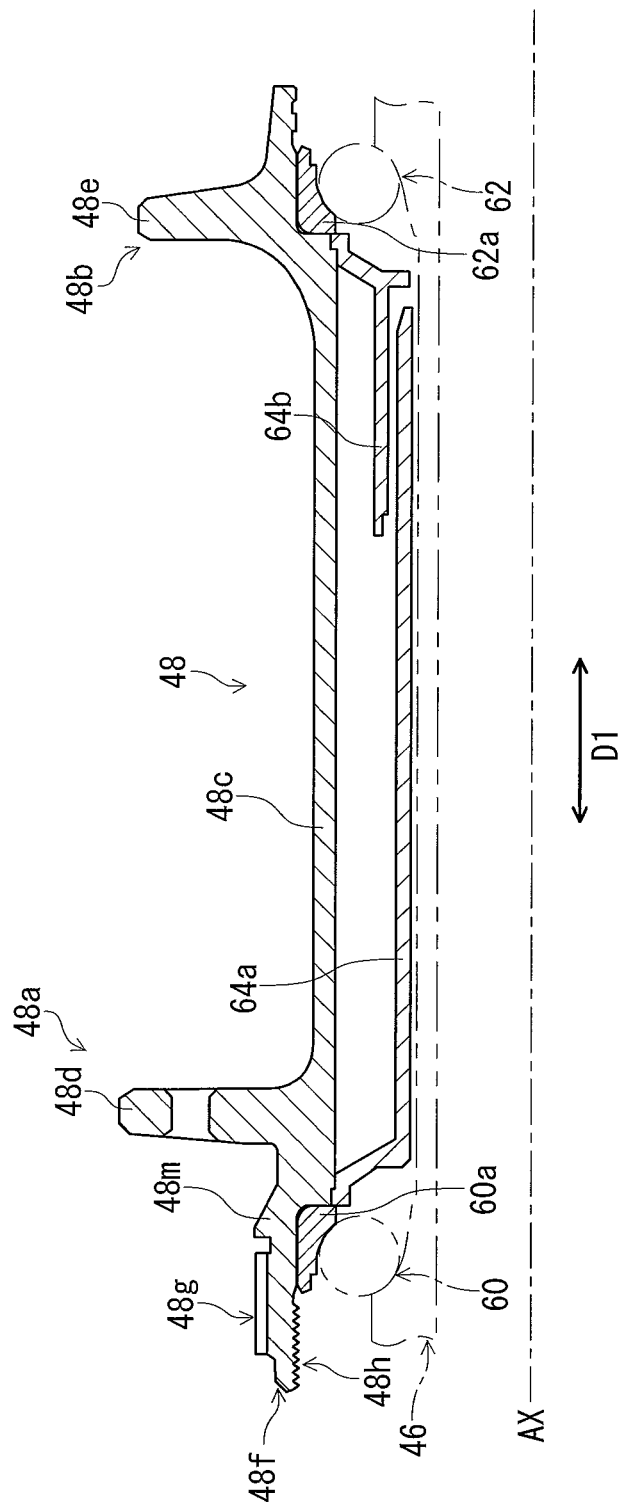
FIG. 6 is a partial cross sectional view of the hub shell illustrated in FIG. 5.

As illustrated in FIG. 6, the hub shell 48 further includes an annular abutment flange 48m protruding radially outward from the end tubular portion 48f. The annular abutment flange 48m is provided at the first end portion 48a of the hub shell 48 and is provided on the outer circumferential surface of the end tubular portion 48f. The annular abutment flange 48m is disposed between the hub flange portion 48d and the outer serration portion 48g in the axial direction D1. The annular abutment flange 48m is contactable with the disc brake rotor 50 in the axial direction D1 to define one axial end of an adjustment range of the disc brake rotor 50.

As seen in FIG. 6, the hub axle 46 extends through the hub shell 48 in the axial direction D1 and is secured to the front fork 20. The hub shell 48 is rotatably supported by the hub axle 46 via a first bearing assembly 60 and a second bearing 62. An outer race 60a of the first bearing assembly 60 is fitted in the end tubular portion 48f. The outer race 60a is located between the center tubular portion 48c and the threaded hole 48h in the axial direction D1. An outer race 62a of the second bearing 62 is fitted in the second end portion 48b of the hub shell 48. A first inner tubular member 64a and a second inner tubular member 64b are provided inside the hub shell 48 to prevent grease loss.

Figure 7:
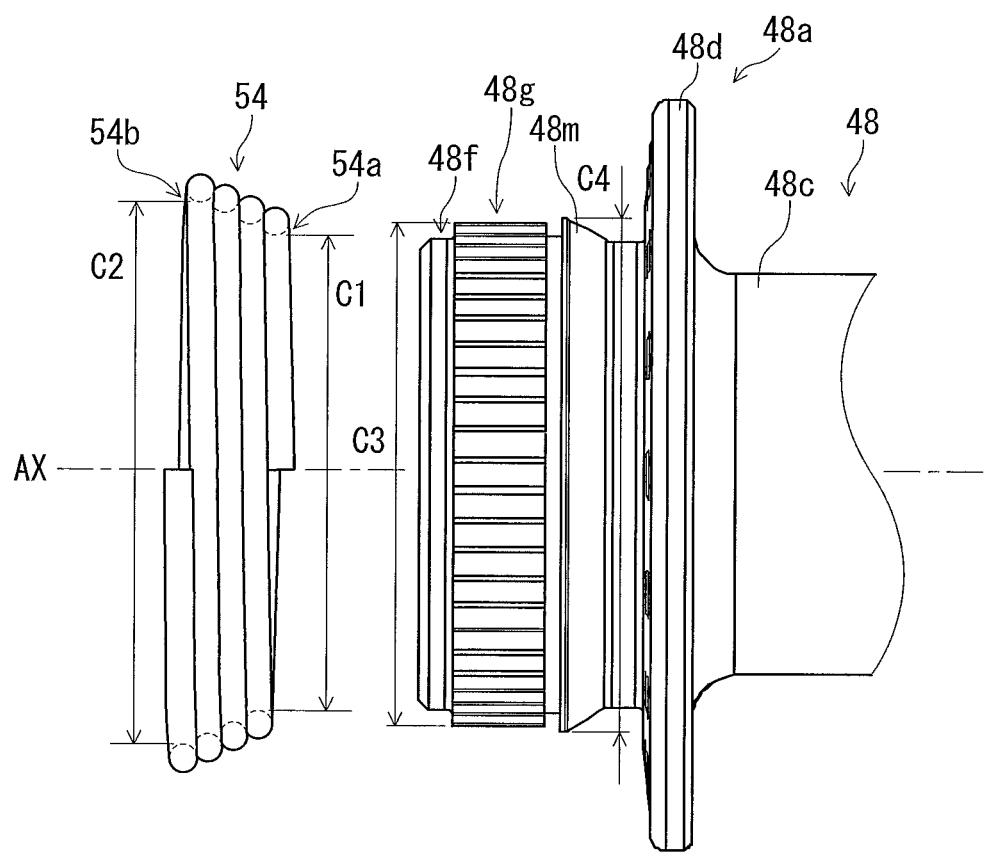
FIG. 7 is an exploded partial front elevational view of the hub shell and a biasing member provided in the bicycle disc brake rotor assembly illustrated in FIG. 4.

As illustrated in FIG. 7, the biasing member 54 is configured to be arranged around the end tubular portion 48f of the first end portion 48a. The biasing member 54 is configured to bias the disc brake rotor 50 toward a flange portion 82 (FIG. 11) of the adjusting member 56. In the illustrated embodiment, the biasing member 54 comprises a coil spring. The biasing member 54 has a first opening 54a and a second opening 54b. An inner diameter of the biasing member 54 gradually increases from the first opening 54a to the second opening 54b. The first opening 54a has an inner diameter C1 and is closer to the hub flange portion 48d of the hub shell 48 than the second opening 54b. The second opening 54b has an inner diameter C2 and is disposed on an opposite side of the first opening 54a in the axial direction D1. In the illustrated embodiment, the inner diameter C2 of the second opening 54b is greater than the inner diameter C1 of the first opening 54a.

As illustrated in FIG. 7, the outer serration portion 48g of the first end portion 48a has a maximum outer diameter C3. The annular abutment flange 48m has a maximum outer diameter C4 greater than the maximum outer diameter C3 of the outer serration portion 48g. The inner diameter C1 of the first opening 54a is smaller than the maximum outer diameters C3 and C4. The inner diameter C2 of the second opening 54b is greater than the maximum outer diameters C3 and C4. When the biasing member 54 is disposed around the end tubular portion 48f of the first end portion 48a, the first opening 54a of the biasing member 54 is elastically enlarged in the radial direction of the biasing member 54. The shape of the biasing member 54 is not limited to the illustrated embodiment. It will be apparent to those skilled in the bicycle field that the inner diameter C2 can be substantially the same as or smaller than the inner diameter C1. Furthermore, it will be apparent to those skilled in the bicycle field that the inner diameter C1 can be substantially the same as or greater than the maximum outer diameters C3 and C4.

Figure 8:
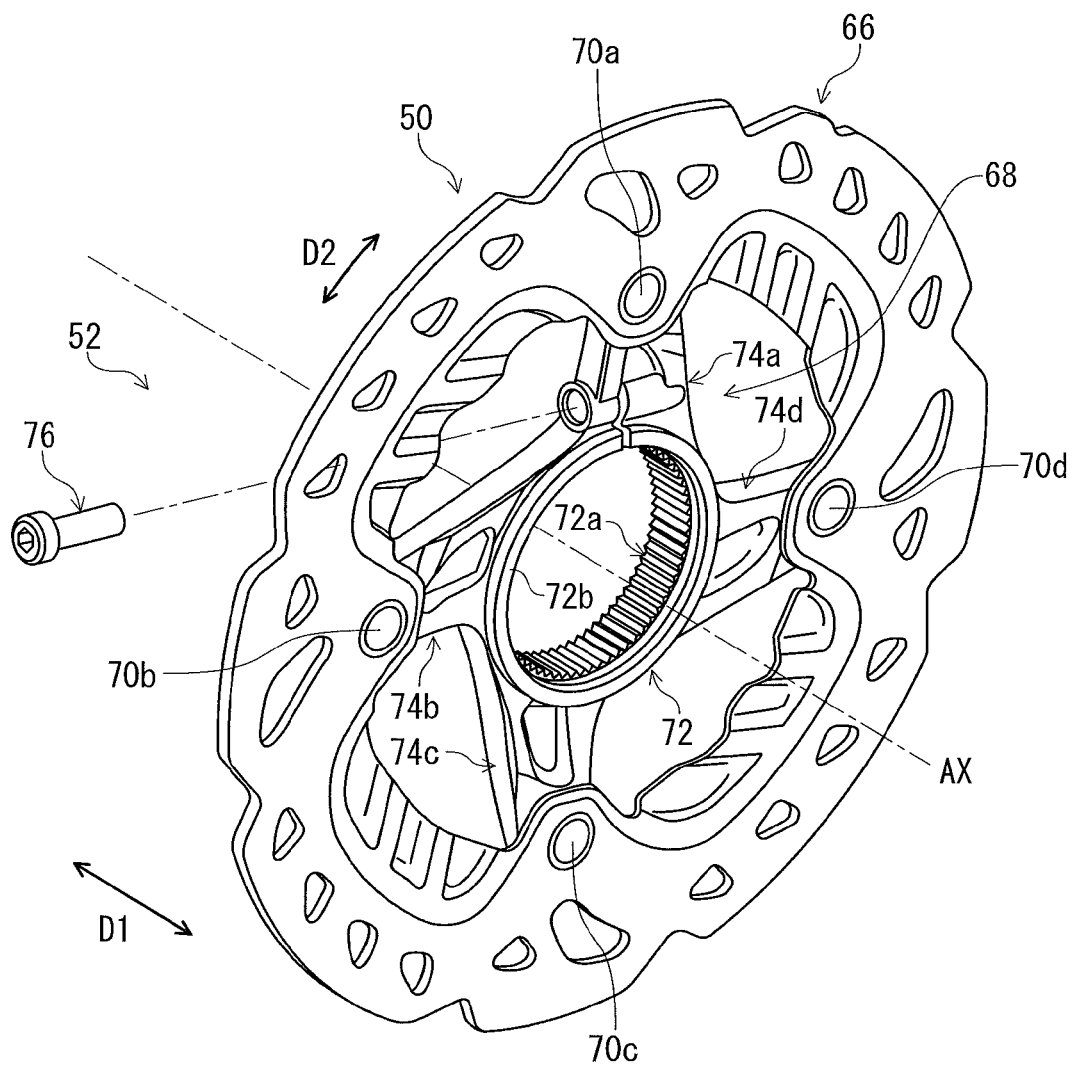
FIG. 8 is a perspective view of a disc brake rotor provided in the bicycle disc brake rotor assembly illustrated in FIG. 4.

As illustrated in FIG. 8, the disc brake rotor 50 includes a rotor member 66, a hub mounting member 68, and fastening members 70a, 70b, 70c and 70d. The rotor member 66 has a ring shape and serves as an outer peripheral frictional surface of the disc brake rotor 50. The rotor member 66 is preferably made of metallic material such as stainless steel. The hub mounting member 68 is fixedly attached to the rotor member 66 by the fastening members 70a, 70b, 70c and 70d. The hub mounting member 68 is located radially inward of the rotor member 66 and is configured to be mounted to the hub shell 48. The hub mounting member 68 is preferably made of metallic material such as aluminum alloy or iron. The disc brake rotor 50 is configured to rotate in a circumferential direction D2 about the rotational axis AX.

As seen in FIG. 8, the hub mounting member 68 includes an annular attachment portion 72 and arm portions 74a, 74b, 74c and 74d. The annular attachment portion 72 is configured to be mounted to the hub shell 48 and includes an inner serration portion 72a defining an attachment opening 72b. The inner serration portion 72a is configured to mesh with the outer serration portion 48g of the hub shell 48 such that the hub shell 48 and the disc brake rotor 50 are integrally rotatable in the circumferential direction D2 of the disc brake rotor 50 and are relatively movable in the axial direction D1. The disc brake rotor 50 is configured to be adjustably attached to the hub shell 48 in the axial direction D1 via the outer serration portion 48g and the inner serration portion 72a. However, it will be apparent to those skilled in the bicycle field that the other mechanisms configured to adjustably couple the disc brake rotor 50 to the hub shell 48 in the axial direction D1 can be applied to the bicycle disc brake rotor assembly 24 in stead of the outer serration portion 48g and the inner serration portion 72a.

As illustrated in FIG. 8, the arm portions 74a, 74b, 74c and 74d protrude radially outward from the annular attachment portion 72. The arm portions 74a, 74b, 74c and 74d are substantially equally spaced apart in the circumferential direction D2 and are coupled to the rotor member 66 by the fastening members 70a, 70b, 70c and 70d. The positioning mechanism 52 is configured to adjust an inner diameter of the attachment opening 72b to position the disc brake rotor 50 at the adjusted position. More specifically, the positioning mechanism 52 comprises an adjusting bolt 76 attached to the arm portion 74a.

Figure 9:
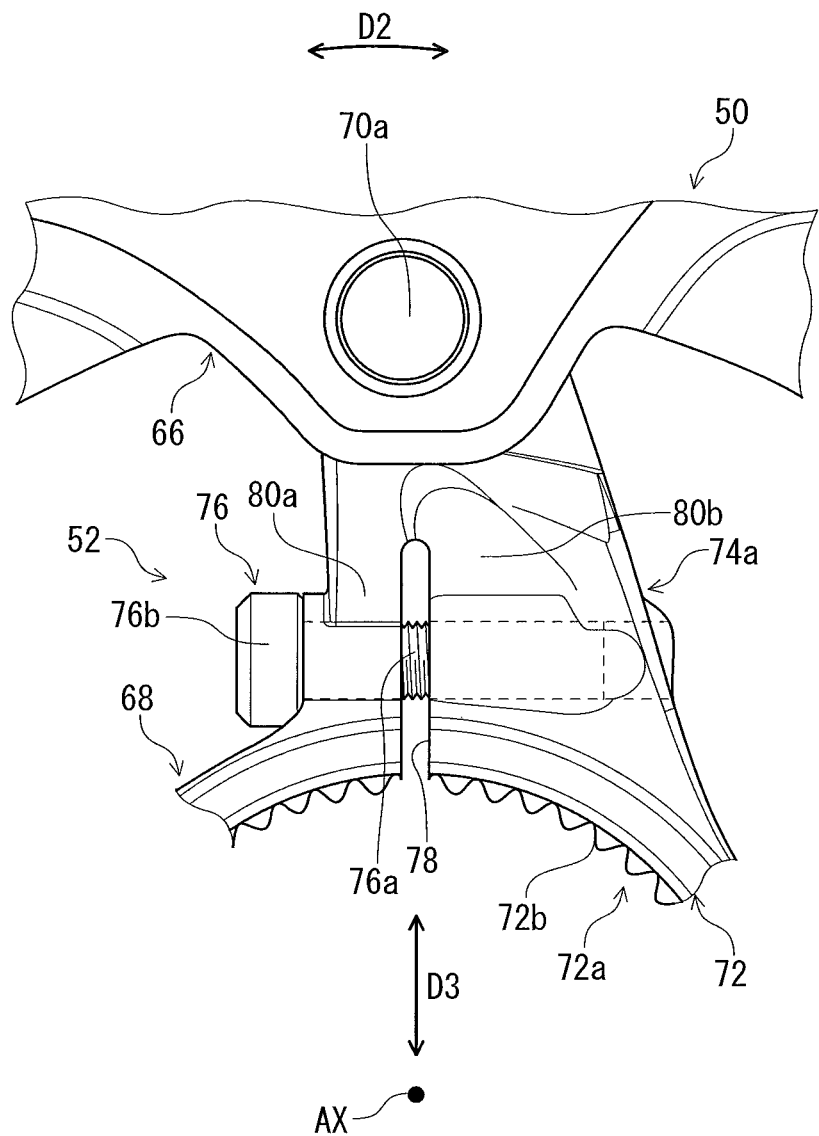
FIG. 9 is a partial elevational view of the disc brake rotor illustrated in FIG. 8.

As illustrated in FIG. 9, the adjusting bolt 76 is screwed in the arm portion 74a and includes a shaft portion 76a and a head portion 76b. The hub mounting member 68 of the disc brake rotor 50 further includes a slit 78 extending in a radial direction D3 of the disc brake rotor 50. The slit 78 is provided at the arm portion 74a and the annular attachment portion 72 so as to connect with the attachment opening 72b. Furthermore, the slit 78 is provided at the arm portion 74a and the annular attachment portion 72 so as to partially divide the arm portion 74a to a first portion 80a and a second portion 80b. It will be apparent to those skilled in the bicycle field that the slit 78 can be provided to at least partially divide the arm portion 74a to the first portion 80a and the second portion 80b. The first portion 80a is spaced apart from the second portion 80b in the circumferential direction D2 of the disc brake rotor 50.

Figure 10:
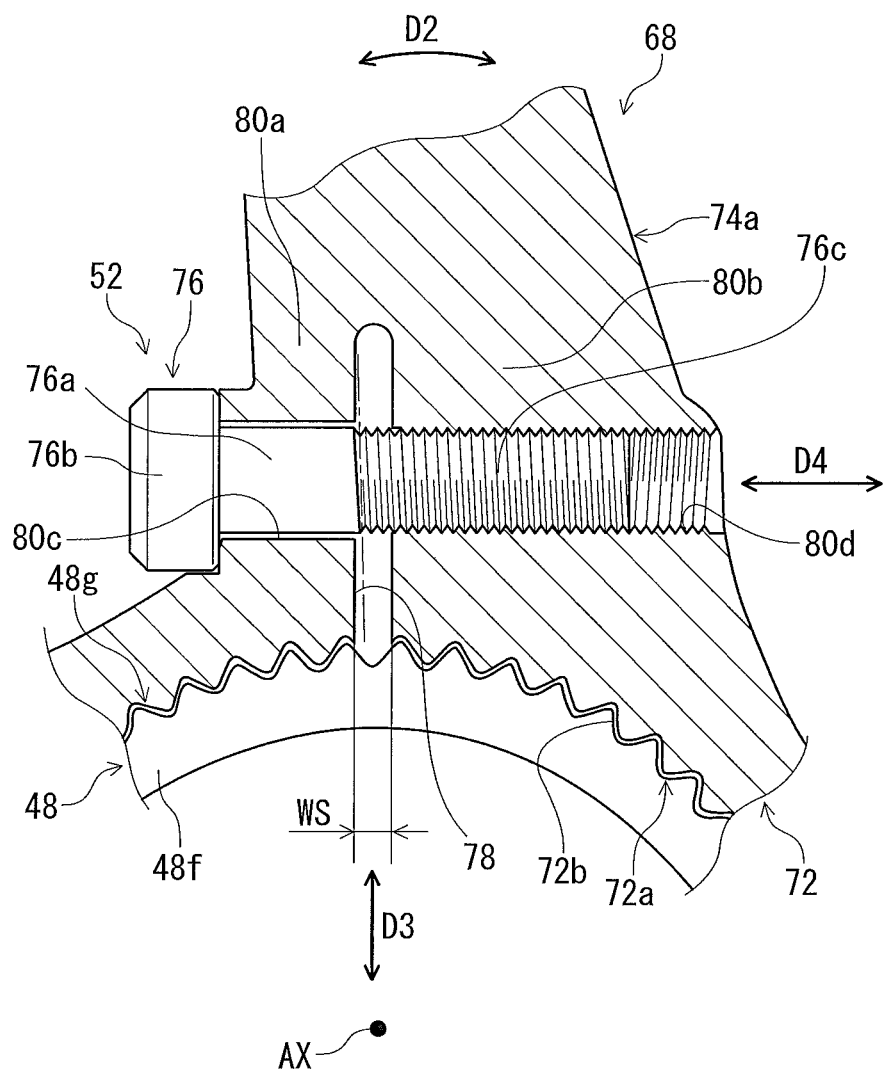
FIG. 10 is a partial cross sectional view of the disc brake rotor illustrated in FIG. 8.

As illustrated in FIG. 10, the first portion 80a includes a through-hole 80c extending in a predetermined direction D4 which is non-parallel to the radial direction D3 of the disc brake rotor 50. In the illustrated embodiment, the predetermined direction D4 is substantially perpendicular to the radial direction D3 and is substantially parallel to the circumferential direction D2. The second portion 80b includes an inner thread 80d extending in the predetermined direction D4. The shaft portion 76a of the adjusting bolt 76 has an external thread 76c and is configured to be inserted in the through-hole 80c of the first portion 80a. The external thread 76c is configured to be screwed in the inner thread 80d of the second portion 80b. The external thread 76c and the inner thread 80d are configured to convert the relative rotation between the adjusting bolt 76 and the arm portion 74a into the relative movement between the adjusting bolt 76 and the arm portion 74a in the predetermined direction D4. The head portion 76b is provided at an end of the shaft portion 76a and has an outer diameter larger than an inner diameter of the through-hole 80c of the first portion 80a. The head portion 76b is provided on an opposite side of the second portion 80b with respect to the first portion 80a to contact the first portion 80a.

As illustrated in FIG. 10, the positioning mechanism 52 is configured to change a width WS of the slit 78 to adjust an inner diameter of the attachment opening 72b. The disc brake rotor 50 and the hub shell 48 are relatively movable in the axial direction D1 along the outer serration portion 48g and the inner serration portion 72a in a state where the adjusting bolt 76 is not screwed or is loosened in the arm portion 74a of the hub mounting member 68. In this state, the relative position between the disc brake rotor 50 and the hub shell 48 can be changed in the axial direction D1. When the adjusting bolt 76 is tighten in a state where the head portion 76b contacts the first portion 80a, the head portion 76b gradually moves toward the second portion 80b because of the external thread 76c and the inner thread 80d. As a result, the arm portion 74a and the annular attachment portion 72 are elastically deformed by the tightening force of the adjusting bolt 76. In the illustrated embodiment, as shown by a chain line in the slit 78 of FIG. 10, the first portion 80a and the second portion 80b gradually approach relative to each other to shorten the width WS of the slit 78 and the inner diameter of the attachment opening 72b. Accordingly, the outer serration portion 48g of the hub shell 48 is tightened by the inner serration portion 72a of the annular attachment portion 72. The disc brake rotor 50 is prevented from moving relative the hub shell 48 in the axial direction D1 in a state where the outer serration portion 48g is tightened by the inner serration portion 72a. Therefore, the disc brake rotor 50 is positioned relative to the hub shell 48 in the axial direction D1 by the adjusting bolt 76 of the positioning mechanism 52.

When the adjusting bolt 76 is loosened in a state where the width WS of the slit 78 is shortened by the adjusting bolt 76, the head portion 76b gradually moves away from the second portion 80b. As a result, the first portion 80a and the second portion 80b moves away from each other to increase the width WS of the slit 78 and the inner diameter of the attachment opening 72b until the hub mounting member 68 is in the free state. The outer serration portion 48g of the hub shell 48 is released from the tightening of the inner serration portion 72a of the annular attachment portion 72 in the free state of the hub mounting member 68. Accordingly, the hub shell 48 and the disc brake rotor 50 are relatively movable in the axial direction D1 in a state where the outer serration portion 48g is released from the tightening of the inner serration portion 72a. As described above, the disc brake rotor 50 can be positioned relative to the hub shell 48 in the axial direction D1 at the adjusted portion by the adjusting bolt 76 and the slit 78 of the positioning mechanism 52. It will be apparent to those skilled in the bicycle field that the other mechanisms configured to adjust the inner diameter of the attachment opening 72b to position the disc brake rotor 50 at the adjusted position can be applied to the bicycle disc brake rotor assembly 24 instead of the adjusting bolt 76 and the slit 78.

Figure 11:
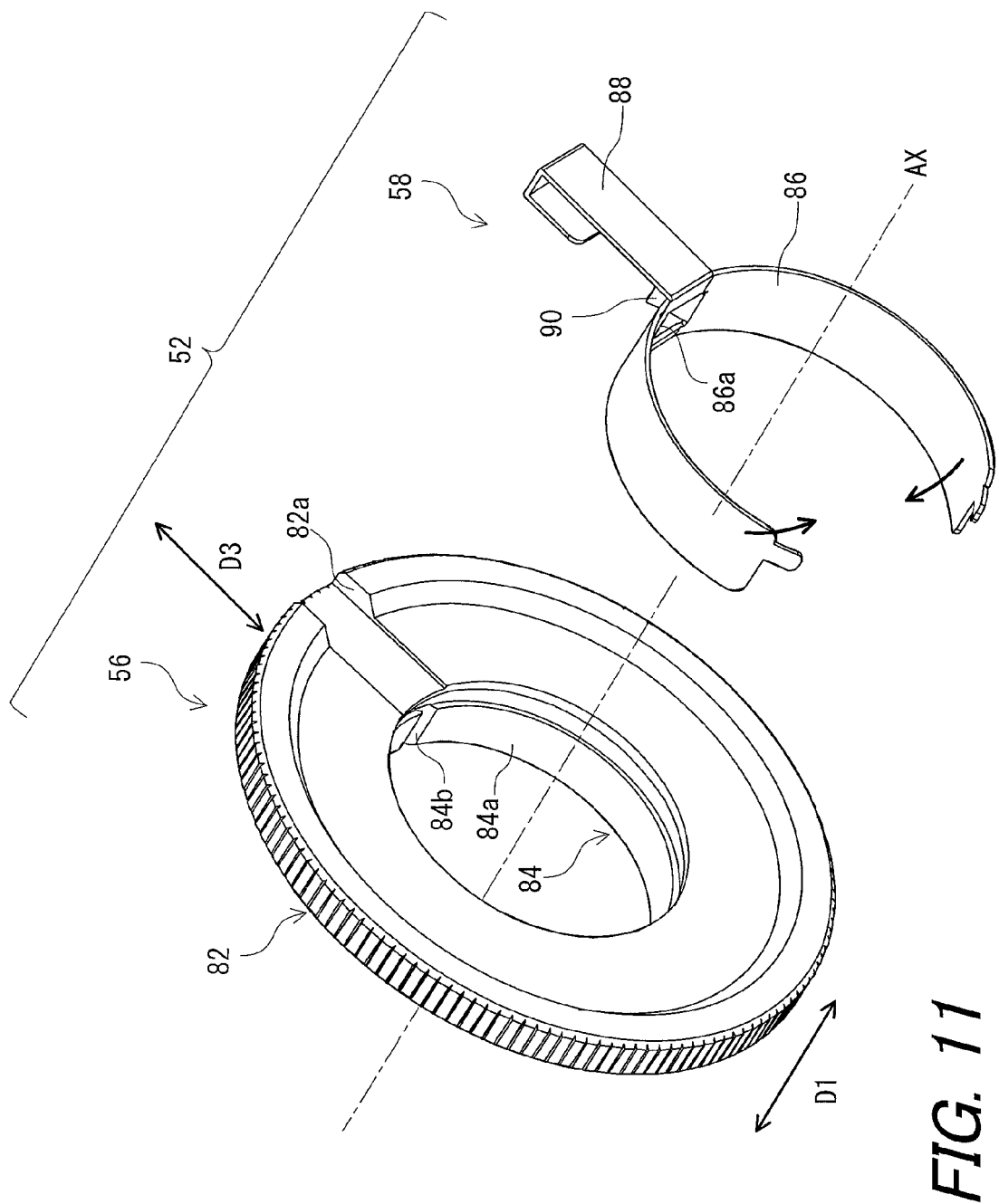
FIG. 11 is an exploded perspective view of a positioning mechanism illustrated in FIG. 4.

As illustrated in FIG. 11, the positioning mechanism 52 further includes the adjusting member 56 and the lock member 58. The adjusting member 56 is configured to be attached to the first end portion 48a of the hub shell 48 (FIG. 5). The adjusting member 56 includes the flange portion 82 and a tubular portion 84. The flange portion 82 has a ring shape and is configured to contact the disc brake rotor 50. The flange portion 82 includes an attachment groove 82a extending in the radial direction D3 of the disc brake rotor 50. The tubular portion 84 includes an inner peripheral surface 84a.

As illustrated in FIG. 11, the lock member 58 is configured to be attached to the adjusting member 56 to prevent the adjusting member 56 from being unintentionally removed from the hub shell 48. The lock member 58 is preferably made of elastic material such as spring steel and is integrally provided as a one-piece unitary member. The lock member 58 includes a spring portion 86, a hook portion 88 and a lock protrusion 90. The spring portion 86 is a substantially C-shaped portion and is elastically deformable to change the outer diameter thereof. The spring portion 86 is disposed so as to contact with the inner peripheral surface 84a of the adjusting member 56 in a state where the lock member 58 is attached to the adjusting member 56. The spring portion 86 has the outer diameter greater than the inner diameters of the inner peripheral surface 84a. The spring portion 86 is elastically deformed in a state where the lock member 58 is attached to the adjusting member 56.

As illustrated in FIG. 11, the hook portion 88 extends radially outward from the spring portion 86. The hook portion 88 is configured to be hooked to the flange portion 82 of the adjusting member 56; however, it will be apparent to those skilled in the bicycle field that the lock member 58 can be attached to the adjusting member 56 using structures other than the hook portion 88. The lock member 58 can be attached to the adjusting member 56 by fixing members such as bolts.

The hook portion 88 is provided in the attachment groove 82b in a state where the lock member 58 is attached to the adjusting member 56. The attachment groove 82b and the hook portion 88 prevent the adjusting member 56 and the lock member 58 from relatively rotating. The spring portion 86 has an opening 86a near the hook portion 88. The lock protrusion 90 protrudes radially outward from an edge of the opening 86a. The lock protrusion 90 is configured to be arranged in a recess 84b of the adjusting member 56.

Figure 12:
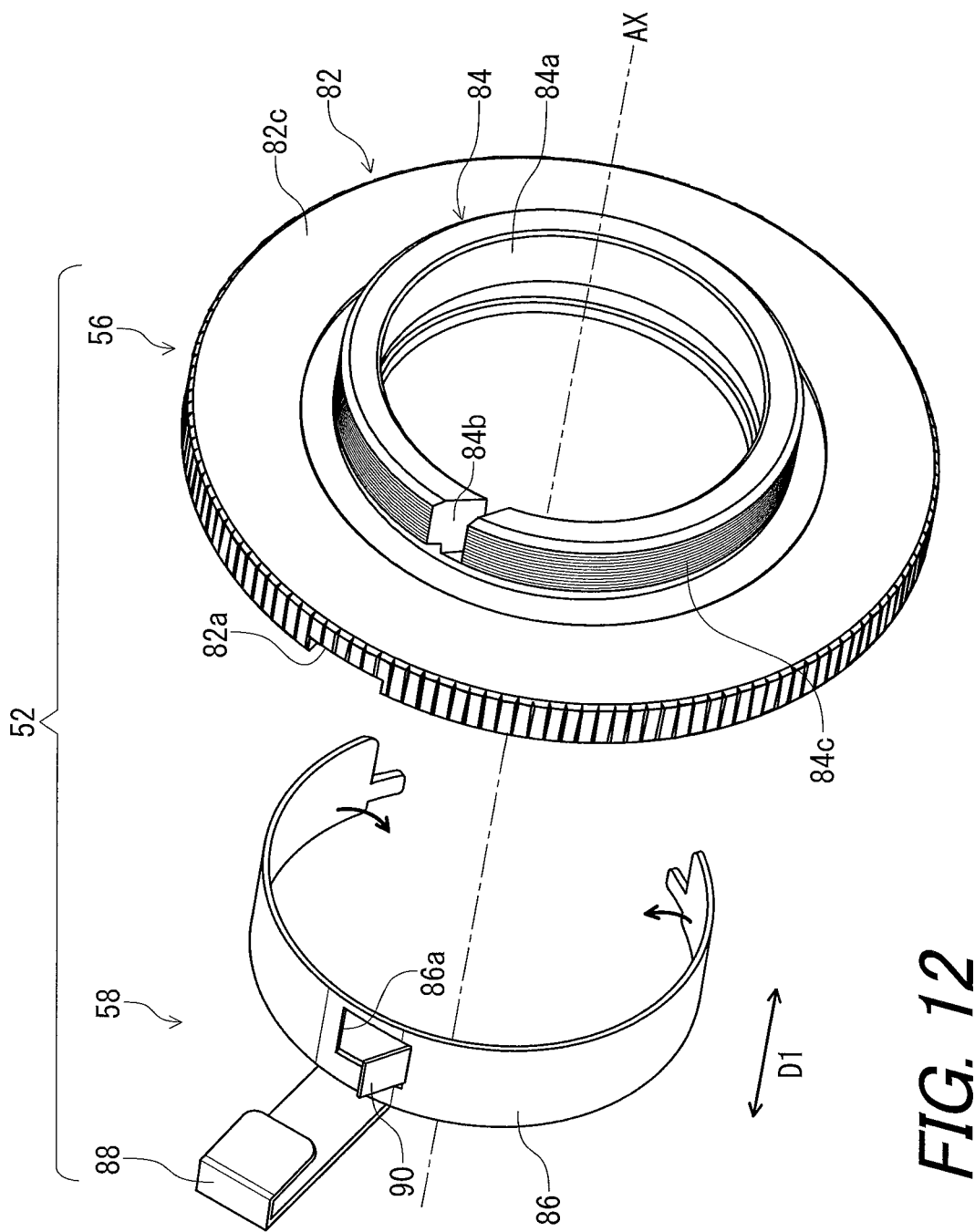
FIG. 12 is an exploded perspective view of the positioning mechanism illustrated in FIG. 4.

As illustrated in FIG. 12, the recess 84b is provided at the tubular portion 84 of the adjusting member 56 and extends from the inner peripheral surface 84a to the outer peripheral surface of the tubular portion 84. The tubular portion 84 protrudes from the flange portion 82 in the axial direction D1. The adjusting member 56 includes an external thread 84c provided on the outer peripheral surface of the tubular portion 84. The external thread 84c is configured to be screwed in the threaded hole 48h of the hub shell 48 (FIG. 5) such that the flange portion 82 is rotatable with respect to the hub shell 48. The external thread 84c and the threaded hole 48h are configured to convert the relative rotation between the hub shell 48 and the adjusting member 56 into the relative movement between the hub shell 48 and the adjusting member 56 in the axial direction D1. It will be apparent to those skilled in the bicycle field that the other mechanisms configured to convert the relative rotation into the relative movement can be applied to the bicycle disc brake rotor assembly 24 instead of the external thread 84c and the threaded hole 48h. The flange portion 82 further includes an abutment surface 82c having an annular shape. The abutment surface 82c is configured to slidably abut against the annular attachment portion 72 of the disc brake rotor 50.

Figure 13:
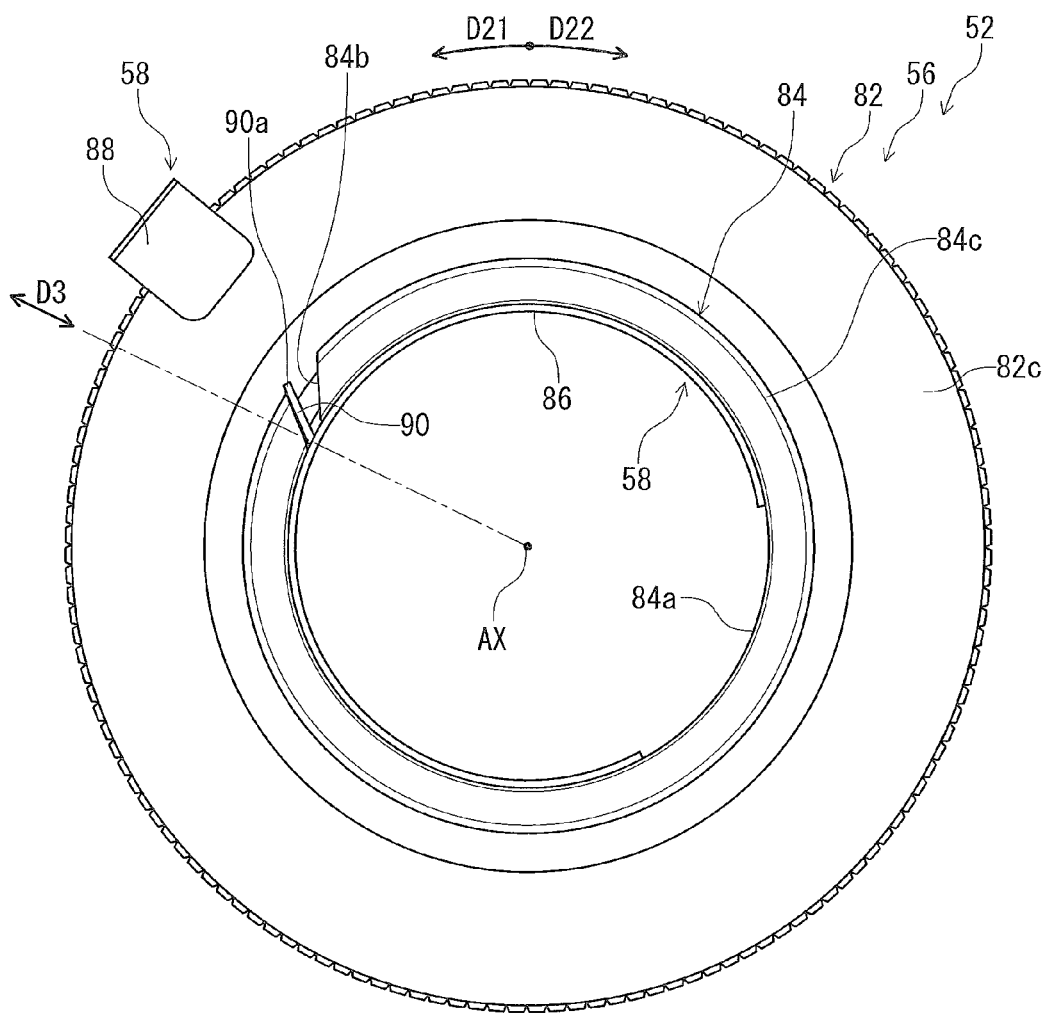
FIG. 13 is an elevational view of the positioning mechanism illustrated in FIG. 4.

As illustrated in FIG. 13, a length of the lock protrusion 90 is greater than a radial length of the tubular portion 84. A radially outer end 90a of the lock protrusion 90 is disposed more to the radially outer side than the external thread 84c in the free state of the lock protrusion 90. The lock protrusion 90 is inclined relative to the radial direction D3 of the disc brake rotor 50. The external thread 84c of the tubular portion 84 is configured to be screwed in the threaded hole 48h of the hub shell 48 when the adjusting member 56 is rotated in a first rotational direction D21 which corresponds to one direction of the circumferential direction D2 relative to the hub shell 48. The external thread 84c is loosened in the threaded hole 48h when the adjusting member 56 is rotated in a second rotational direction D22 which corresponds to the other direction of the circumferential direction D2 relative to the hub shell 48.

Figure 14:
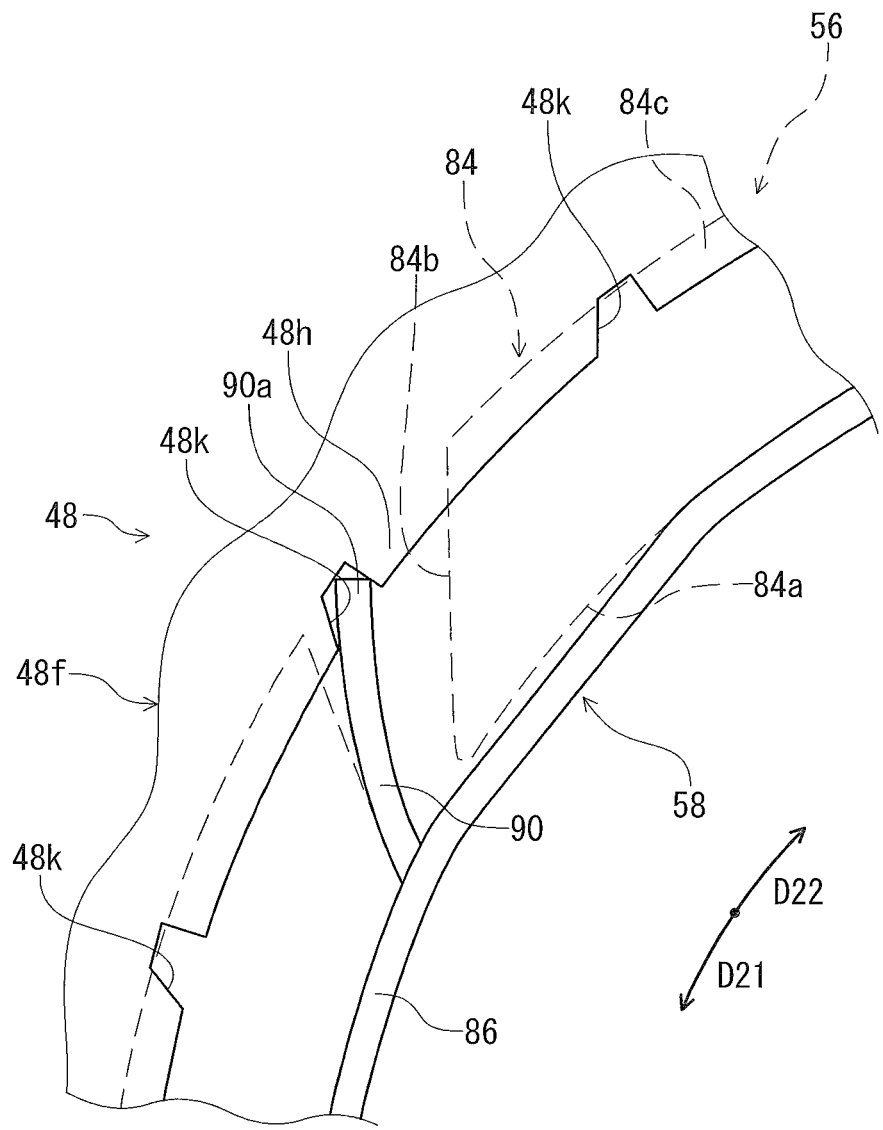
FIG. 14 is a partial elevational view of the positioning mechanism illustrated in FIG. 4.

As illustrated in FIG. 14, the radially outer end 90a of the lock protrusion 90 is configured to be fitted in one of the lock grooves 48k. The lock protrusion 90 is elastically deformed in a state where the lock protrusion 90 is fitted in one of the lock grooves 48k. The inclination of the lock protrusion 90 allows the adjusting member 56 to rotate in the first rotational direction D21 relative to the hub shell 48 and prevents the adjusting member 56 from rotating in the second rotational direction D22 relative to the hub shell 48. It will be apparent to those skilled in the bicycle field that the lock member 58 can be omitted if the adjusting member 56 has a function to prevent the adjusting member 56 from being unintentionally removed from the hub shell 48.

Figure 15:
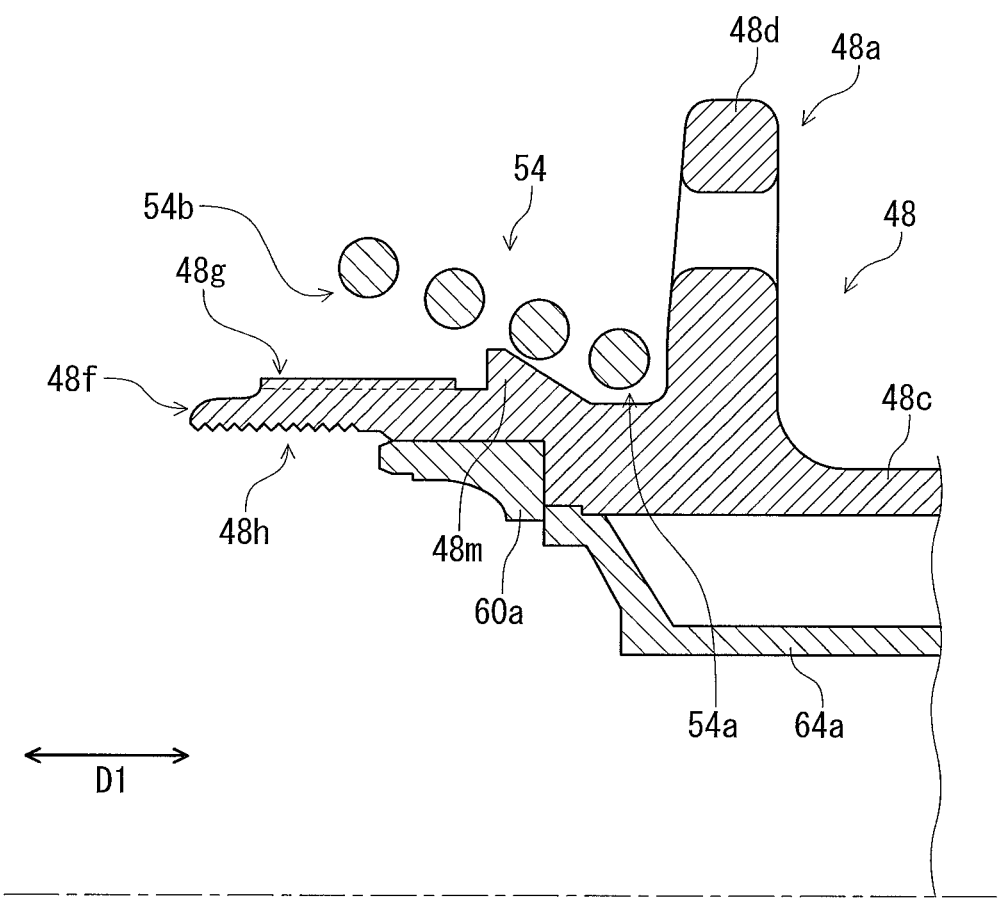
FIG. 15 is a partial cross sectional view for explaining the method of assembling the bicycle disc brake rotor assembly illustrated in FIG. 4.

The method of assembling the bicycle disc brake rotor assembly 24 will be described below referring to FIGS. 15 to 18. As illustrated in FIG. 15, the biasing member 54 is attached to the hub shell 48 such that the biasing member 54 at least partially surrounds the end tubular portion 48f. The first opening 54a of the biasing member 54 is elastically enlarged in the radial direction of the biasing member 54 when the biasing member 54 is attached to the end tubular portion 48f. The biasing member 54 is arranged radially outward of the annular abutment flange 48m of the hub shell 48 in a state where the biasing member 54 is attached to the hub shell 48. The outer serration portion 48g of the hub shell 48 is located in the second opening 54b of the biasing member 54 in the free state of the biasing member 54.

Figure 16:
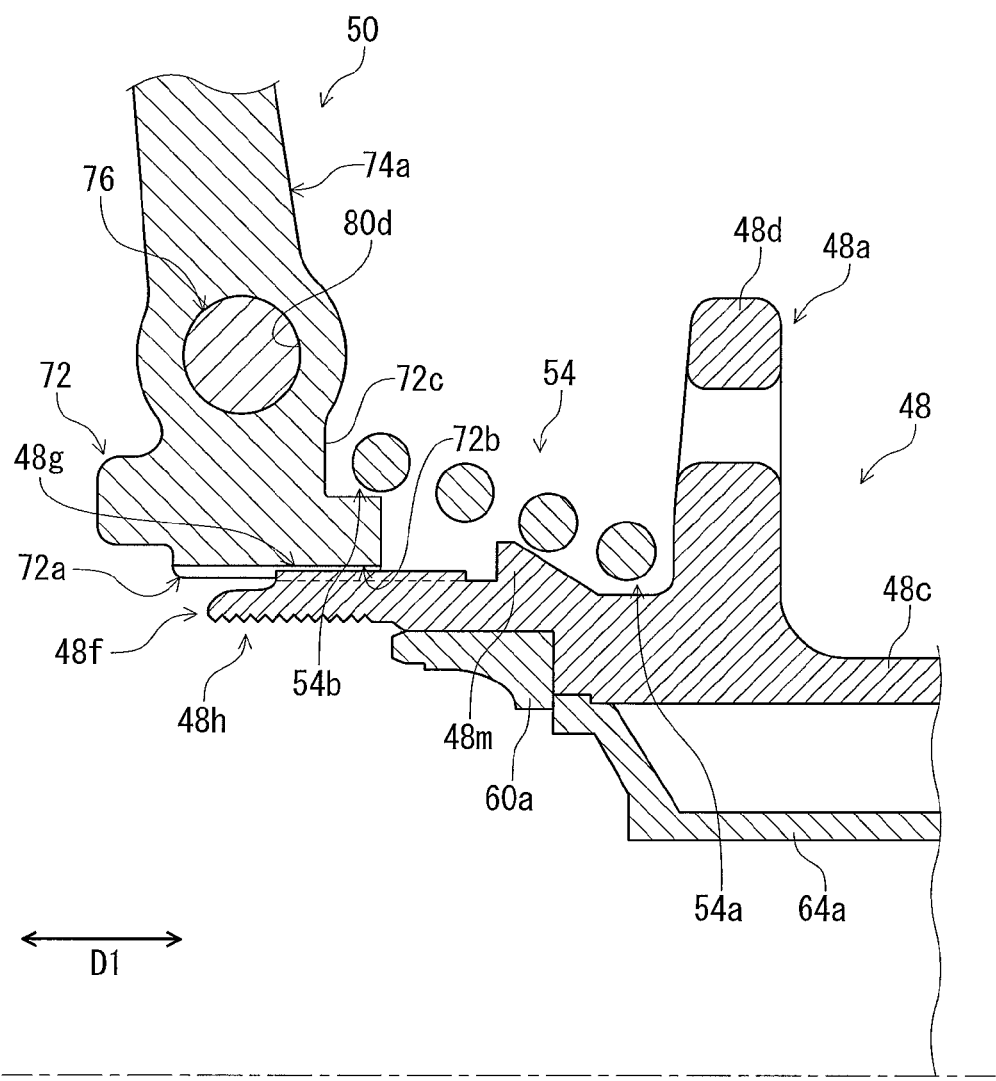
FIG. 16 is a partial cross sectional view for explaining the method of assembling the bicycle disc brake rotor assembly illustrated in FIG. 4.

As illustrated in FIG. 16, the disc brake rotor 50 is mounted to the first end portion 48a of the hub shell 48. More specifically, the end tubular portion 48f of the hub shell 48 is inserted into the attachment opening 72b of the disc brake rotor 50 so that the outer serration portion 48g meshes with the inner serration portion 72a. The outer serration portion 48g and the inner serration portion 72a are configured to prevent the disc brake rotor 50 and the hub shell 48 from relatively rotating. The outer serration portion 48g and the inner serration portion 72a are further configured to allow the disc brake rotor 50 and the hub shell 48 to relatively move in the axial direction D1. The biasing member 54 is provided between the disc brake rotor 50 and the hub flange portion 48d of the hub shell 48 in a state where the biasing member 54 and the disc brake rotor 50 are attached to the hub shell 48. The annular attachment portion 72 includes a receiving surface 72c configured to contact the biasing member 54 to receive the elastic force from the biasing member 54. The end tubular portion 48f of the hub shell 48 is inserted into the attachment opening 72b until the receiving surface 72c contact the biasing member 54, for example.

Figure 17:
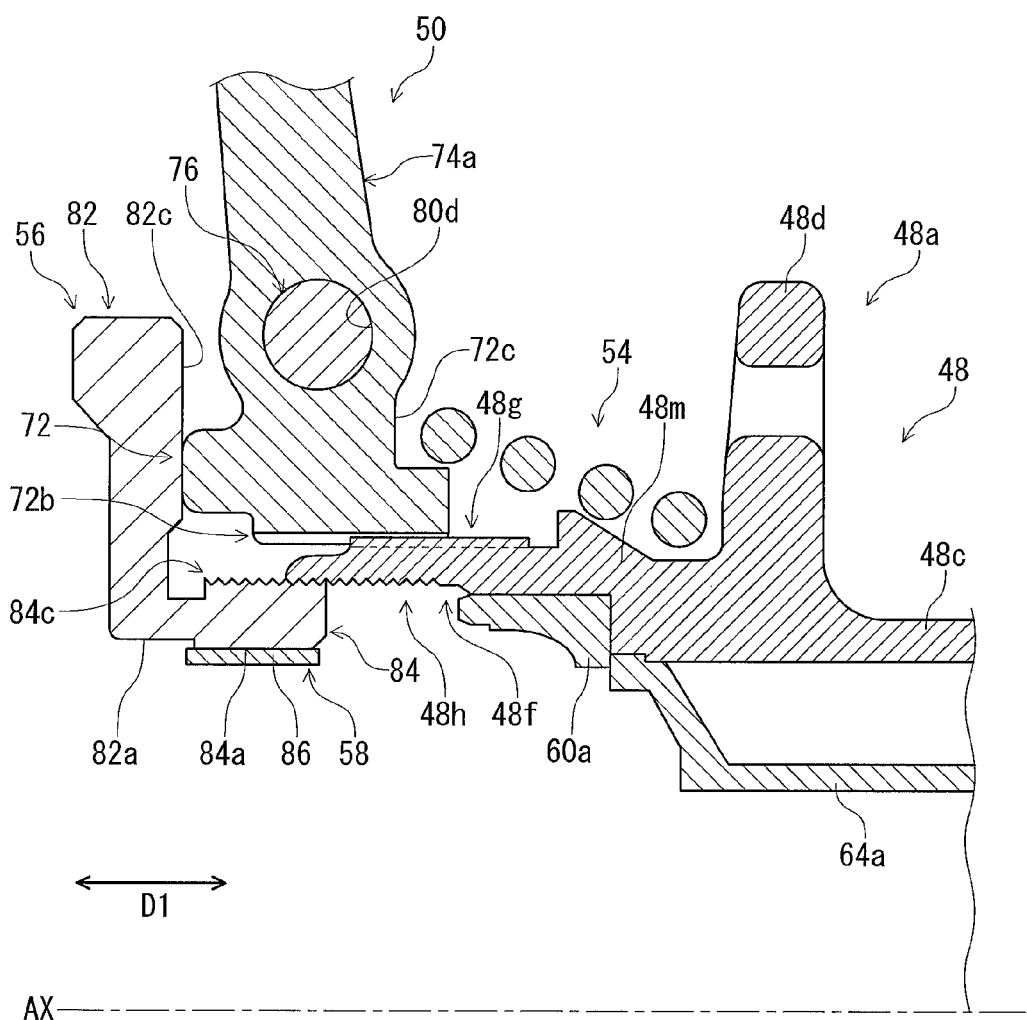
FIG. 17 is a partial cross sectional view for explaining the method of assembling the bicycle disc brake rotor assembly illustrated in FIG. 4.

As illustrated in FIG. 17, the adjusting member 56 is attached to the hub shell 48 after the disc brake rotor 50 is mounted to the hub shell 48. More specifically, the external thread 84c of the adjusting member 56 is screwed into the threaded hole 48h of the hub shell 48. The lock member 58 is attached to the adjusting member 56 before the adjusting member 56 is attached to the hub shell 48, for example. The external thread 84c is screwed into the threaded hole 48h until the abutment surface 82c of the adjusting member 56 contact the annular attachment portion 72 of the disc brake rotor 50.

Figure 18:
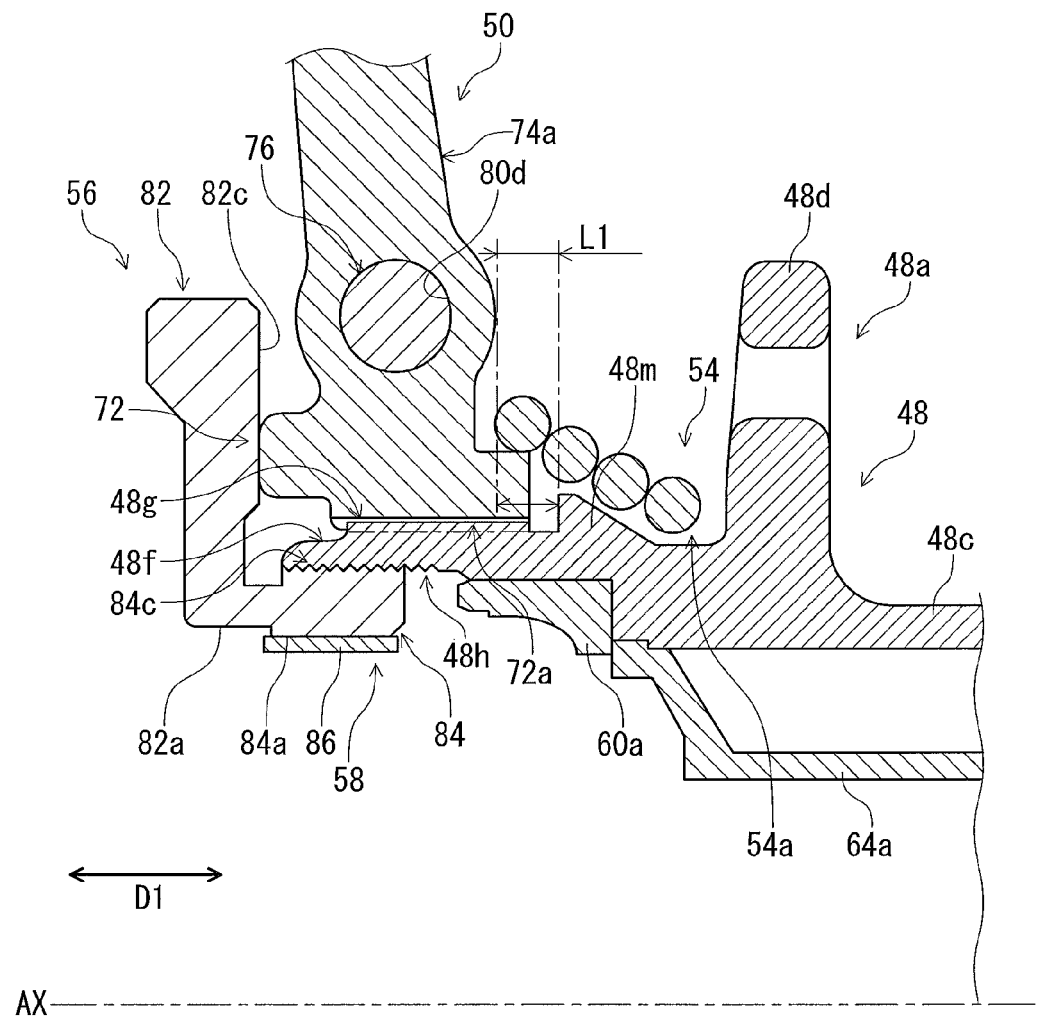
FIG. 18 is a partial cross sectional view for explaining the method of assembling the bicycle disc brake rotor assembly illustrated in FIG. 4.

As illustrated in FIG. 18, when the adjusting member 56 is further rotated so that the external thread 84c is further screwed in the threaded hole 48h, the adjusting member 56 moves toward the hub flange portion 48d. When the adjusting member 56 moves toward the hub flange portion 48d to press the disc brake rotor 50 toward the hub flange portion 48d, the biasing member 54 is elastically compressed in the axial direction D1 between the disc brake rotor 50 and the hub flange portion 48d. In a state where the biasing member 54 is elastically compressed between the disc brake rotor 50 and the hub flange portion 48d in the axial direction D1, the disc brake rotor 50 is pressed against the flange portion 82 of the adjusting member 56 by the biasing member 54. Accordingly, the disc brake rotor 50 is positioned in the axial direction D1 by the adjusting member 56 and the biasing member 54 in a state where the biasing member 54 is elastically compressed between the disc brake rotor 50 and the hub flange portion 48d.

Furthermore, the rotation of the adjusting member 56 relative to the hub shell 48 changes the axial position of the disc brake rotor 50 relative to the hub shell 48, which allows the position of the disc brake rotor 50 to be adjusted relative to the hub shell 48 in the axial direction D1. The adjusting member 56 is rotated relative to the hub shell 48 until the disc brake rotor 50 is located at an adjusted position in the axial direction D1. When the adjusting member 56 is rotated relative to the hub shell 48, the lock protrusion 90 of the lock member 58 slides on the inner surface of the threaded hole 48h of the hub shell 48 (FIG. 14). As seen in FIG. 14, then the lock protrusion 90 is fitted into one of the lock grooves 48k provided in the threaded hole 48h, the adjusting member 56 is positioned relative to the hub shell 48 in the circumferential direction D2 and is prevented from rotating relative to the hub shell 48 in the second rotational direction D22. As illustrated in FIG. 18, the position of the disc brake rotor 50 can be adjusted relative to the hub shell 48 in the axial direction D1 within the adjustment range L1 defined between the end surface of the annular attachment portion 72 and the annular abutment flange 48m, for example.

After the disc brake rotor 50 is positioned relative to the hub shell 48 in the axial direction D1 by the adjusting member 56 and the biasing member 54, the adjusting bolt 76 is tightened in the inner thread 80d of the arm portion 74a to shorten the width WS of the slit 78. Accordingly, the outer serration portion 48g of the hub shell 48 is tightened by the inner serration portion 72a of the disc brake rotor 50, which allows the disc brake rotor 50 to be fixedly positioned relative to the hub shell 48 in the axial direction D1.

As described above, with the bicycle disc brake rotor assembly 24 according the first embodiment, since the disc brake rotor 50 is adjustably attached to the hub shell 48 in the axial direction D1, the position of the disc brake rotor 50 can be adjusted in the axial direction D1 relative to the brake caliper assembly 22 attached to the front fork 20. Furthermore, since the positioning mechanism 52 (the adjusting member 56, the lock member 58, the adjusting bolt 76, and the slit 78) is configured to position the disc brake rotor 50 in the axial direction D1 at an adjusting position, the position of the disc brake rotor 50 can be easily adjusted and positioned relative to the brake caliper assembly 22 in the axial direction D1 in a state where the brake caliper assembly 22 is secured to the front fork 20.

Second Embodiment

Figure 19:
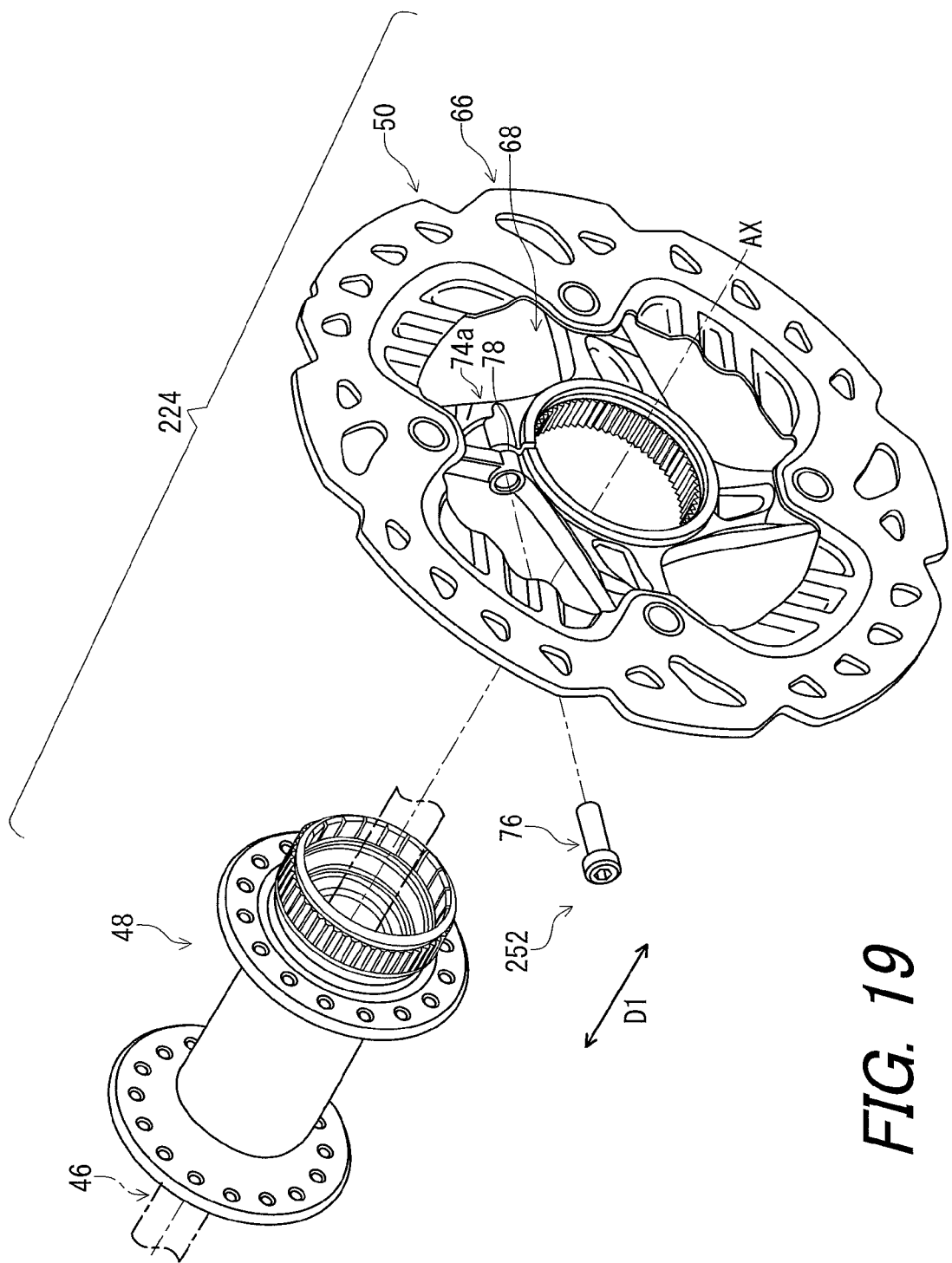
FIG. 19 is an exploded perspective view of a bicycle disc brake rotor assembly in accordance with a second embodiment of the present invention.

A bicycle disc brake rotor assembly 224 in accordance with a second embodiment of the present invention will be described below referring to FIG. 19. Elements having substantially the same function as those in the first embodiment will be numbered the same here, and will not be described again in detail.

The positioning mechanism 52 in accordance with the first embodiment includes the biasing member 54, the adjusting member 56, the lock member 58, the adjusting bolt 76, and the slit 78; however, it will be apparent to those skilled in the bicycle field that the adjusting member 56 and the biasing member 54 can be omitted if the positioning mechanism 52 includes the adjusting bolt 76 and the slit 78. As illustrated in FIG. 19, the bicycle disc brake rotor assembly 224 in accordance with the second embodiment includes the hub axle 46, the hub shell 48, the disc brake rotor 50, and a positioning mechanism 252. The positioning mechanism 252 is configured to position the disc brake rotor 50 in the axial direction D1 at an adjusted position. The positioning mechanism 252 includes the adjusting bolt 76 and the slit 78. The disc brake rotor 50 can be positioned relative to the hub shell 48 in the axial direction D1 by tightening the adjusting bolt 76 as well as the first embodiment.

Third Embodiment

Figure 20:
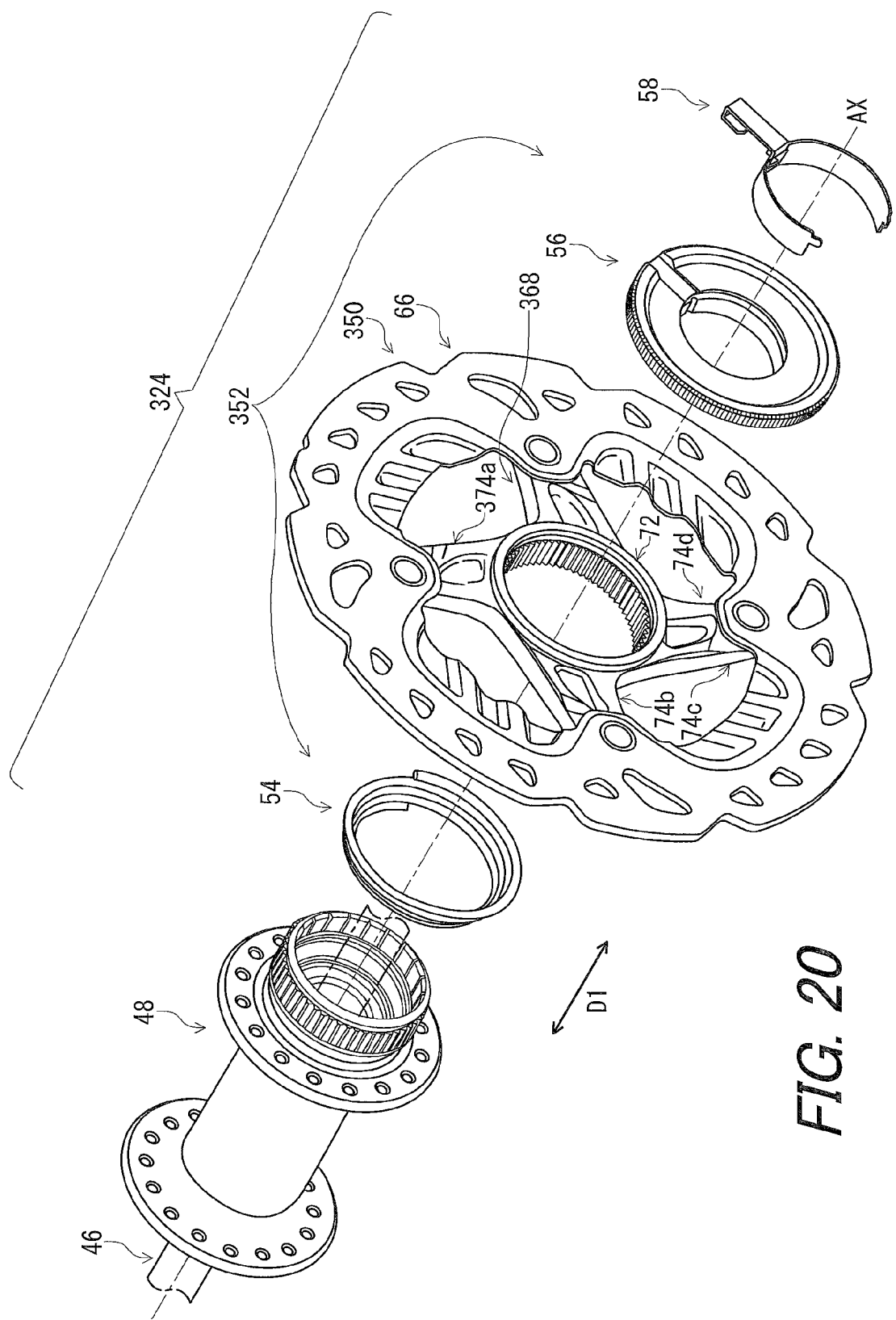
FIG. 20 is an exploded perspective view of a bicycle disc brake rotor assembly in accordance with a third embodiment of the present invention.

A bicycle disc brake rotor assembly 324 in accordance with a third embodiment of the present invention will be described below referring to FIG. 20. Elements having substantially the same function as those in the above embodiments will be numbered the same here, and will not be described again in detail.

The positioning mechanism 52 in accordance with the first embodiment includes the biasing member 54, the adjusting member 56, the lock member 58, the adjusting bolt 76, and the slit 78; however, it will be apparent to those skilled in the bicycle field that the adjusting bolt 76 and the slit 78 can be omitted if the positioning mechanism 52 includes the adjusting member 56 and the biasing member 68. As illustrated in FIG. 20, the bicycle disc brake rotor assembly 324 in accordance with the third embodiment includes the hub axle 46, the hub shell 48, a disc brake rotor 350, and a positioning mechanism 352. The disc brake rotor 350 includes the rotor member and a hub mounting member 368. The hub mounting member 368 includes an arm portion 374a instead of the arm portion 74a of the first embodiment. The arm portion 374a does not include the slit 78 of the first embodiment. The positioning mechanism 352 is configured to position the disc brake rotor 350 in the axial direction D1 at an adjusted position. The positioning mechanism 352 includes the biasing member 54, the adjusting member 56 and the lock member 58. The disc brake rotor 350 can be positioned relative to the hub shell 48 in the axial direction D1 by the biasing member 54 and the adjusting member 56 as well as the first embodiment.

Fourth Embodiment

Figure 21:
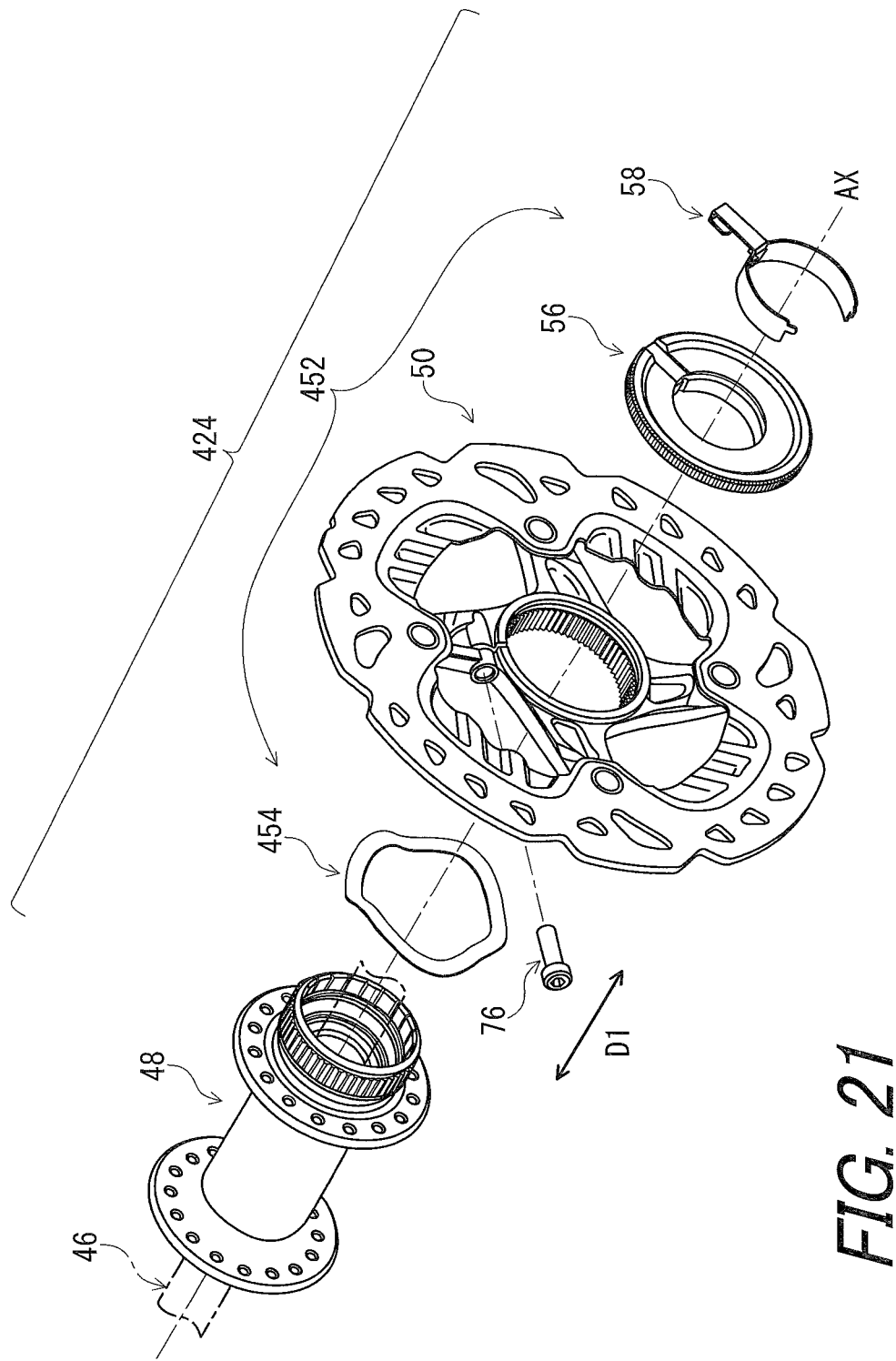
FIG. 21 is a partial cross sectional view of a bicycle disc brake rotor assembly in accordance with a fourth embodiment of the present invention.

A bicycle disc brake rotor assembly 424 in accordance with a fourth embodiment of the present invention will be described below referring to FIG. 21. Elements having substantially the same function as those in the above embodiments will be numbered the same here, and will not be described again in detail.

The biasing member 54 in accordance with the first and third embodiments comprises a coil spring; however, it will be apparent to those skilled in the bicycle field that the biasing member 54 can comprise a wave spring in stead of the coil spring. As illustrated in FIG. 21, the bicycle disc brake rotor assembly 424 includes a positioning mechanism 452 including a biasing member 454, the adjusting member 56 and the lock member 58. The biasing member 454 is a wave spring. The biasing member 454 can include two or more wave springs. The disc brake rotor 50 can be positioned relative to the hub shell 48 in the axial direction D1 by the biasing member 454 and the adjusting member 56 as well as the first embodiment.

Fifth Embodiment

Figure 22:
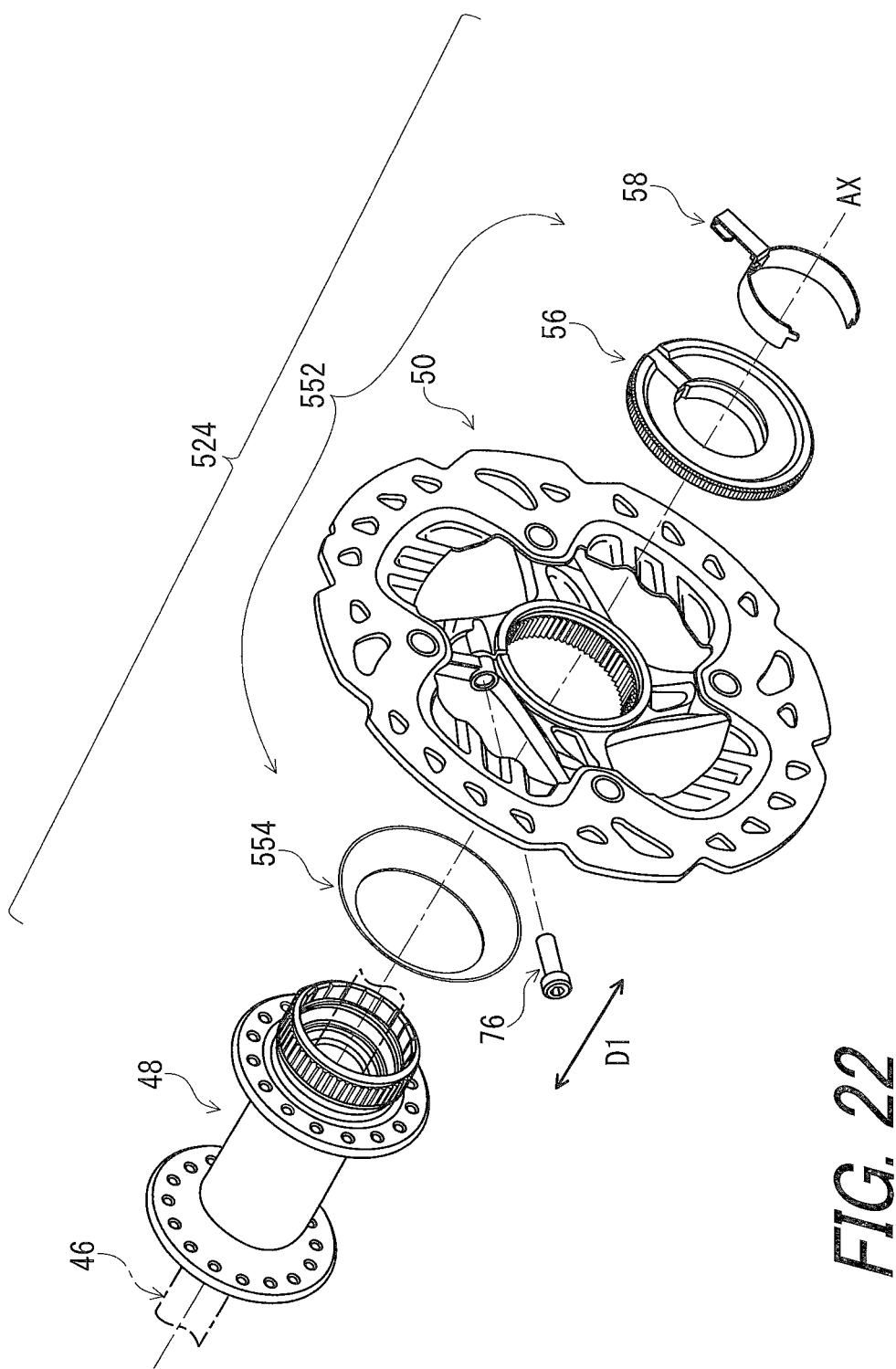
FIG. 22 is a partial cross sectional view of a bicycle disc brake rotor assembly in accordance with a fifth embodiment of the present invention.

A bicycle disc brake rotor assembly 524 in accordance with a fifth embodiment of the present invention will be described below referring to FIG. 22. Elements having substantially the same function as those in the above embodiments will be numbered the same here, and will not be described again in detail.

The biasing member 54 in accordance with the first and third embodiments comprises a coil spring; however, it will be apparent to those skilled in the bicycle field that the biasing member 54 can comprise a disc spring in stead of the coil spring or the wave spring. As illustrated in FIG. 22, the bicycle disc brake rotor assembly 524 includes a positioning mechanism 552 including a biasing member 554, the adjusting member 56 and the lock member 58. The biasing member 554 is a disc spring. The biasing member 554 can include two or more disc springs. The disc brake rotor 50 can be positioned relative to the hub shell 48 in the axial direction D1 by the biasing member 554 and the adjusting member 56 as well as the first embodiment.

The term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This definition also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This definition also applies to words of similar meaning, for example, the terms "have", "include" and their derivatives.

The terms "member", "section," "portion," "part" or "element" when used in the singular can have the dual meaning of a single part or a plurality of parts.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle disc brake rotor assembly comprising:
a hub axle extending in an axial direction;
a hub shell rotatably mounted to the hub axle about a rotational axis defined along the axial direction;
a disc brake rotor configured to be adjustably attached to the hub shell in the axial direction, the disc brake rotor being rotatable relative to the hub axle along with the hub shell about the rotational axis; and
a positioning mechanism configured to position the disc brake rotor in the axial direction at an adjusted position, the positioning mechanism including an adjusting member configured to change the adjusted position of the disc brake rotor relative to the hub shell in the axial direction, the positioning mechanism including a biasing member configured to bias the disc brake rotor toward the hub shell in the axial direction, the biasing member having an annular shape, the rotational axis extending through the annular shape of the biasing member when viewed from the axial direction.

2. The bicycle disc brake rotor assembly according to claim 1, wherein
the hub shell extends in the axial direction, the hub shell includes a first end portion having an outer serration portion provided on an outer circumferential surface of the first end portion,
the disc brake rotor includes an inner serration portion defining an attachment opening, and
the inner serration portion of the disc brake rotor is configured to mesh with the outer serration portion of the hub shell such that the hub shell and the disc brake rotor are integrally rotatable in a circumferential direction of the disc brake rotor and are relatively movable in the axial direction.

3. The bicycle disc brake rotor assembly according to claim 2, wherein
the adjusting member is configured to be attached to the first end portion of the hub shell.

4. The bicycle disc brake rotor assembly according to claim 3, wherein
the hub shell further includes a threaded hole at the first end portion, and
the adjusting member includes
a flange portion configured to contact the disc brake rotor, and
a tubular portion protruding from the flange portion in the axial direction and including an external thread configured to be screwed in the threaded hole such that the flange portion is rotatable with respect to the hub shell.

5. The bicycle disc brake rotor assembly according to claim 4, wherein
the biasing member is configured to bias the disc brake rotor toward the flange portion.

6. The bicycle disc brake rotor assembly according to claim 5, wherein
the biasing member comprises one of a coil spring, a wave spring, and a disc spring.

7. The bicycle disc brake rotor assembly according to claim 5, wherein
the first end portion further has a hub flange portion protruding radially outward with respect to the hub axle, and
the biasing member is provided between the disc brake rotor and the hub flange portion.

8. The bicycle disc brake rotor assembly according to claim 7, wherein
the positioning mechanism is configured to adjust an inner diameter of the attachment opening to position the disc brake rotor at the adjusted position.

9. The bicycle disc brake rotor assembly according to claim 8, wherein
the disc brake rotor further includes
an annular attachment portion having the inner serration portion defining the attachment opening,
an arm portion protruding radially outward from the annular attachment portion, and
a slit provided at the arm portion and the annular attachment portion so as to connect with the attachment opening and at least partially divide the arm portion to a first portion and a second portion, and
the positioning mechanism is configured to change a width of the slit to adjust the inner diameter of the attachment opening.

10. The bicycle disc brake rotor assembly according to claim 9, wherein
the first portion includes a through-hole extending in a predetermined direction which is non-parallel to a radial direction of the disc brake rotor,
the second portion includes an inner thread extending in the predetermined direction, and
the positioning mechanism comprises an adjusting bolt including
a shaft portion having an external thread and configured to be inserted in the through-hole of the first portion, the external thread being configured to be screwed in the inner thread of the second portion, and
a head portion provided at an end of the shaft portion and having an outer diameter larger than an inner diameter of the through-hole of the first portion, the head portion being provided on an opposite side of the second portion with respect to the first portion to contact the first portion.

11. The bicycle disc brake rotor assembly according to claim 2, wherein
the positioning mechanism is configured to adjust an inner diameter of the attachment opening to position the disc brake rotor at the adjusted position.

12. The bicycle disc brake rotor assembly according to claim 11, wherein
the disc brake rotor further includes
an annular attachment portion having the inner serration portion defining the attachment opening,
an arm portion protruding radially outward from the annular attachment portion, and
a slit provided at the arm portion and the annular attachment portion so as to connect with the attachment opening and at least partially divide the arm portion to a first portion and a second portion, and
the positioning mechanism is configured to change a width of the slit to adjust the inner diameter of the attachment opening.

13. The bicycle disc brake rotor assembly according to claim 12, wherein
the first portion includes a through-hole extending in a predetermined direction which is non-parallel to a radial direction of the disc brake rotor,
the second portion includes an inner thread extending in the predetermined direction, and
the positioning mechanism comprises an adjusting bolt including
a shaft portion having an external thread and configured to be inserted in the through-hole of the first portion, the external thread being configured to be screwed in the inner thread of the second portion, and
a head portion provided at an end of the shaft portion and having an outer diameter larger than an inner diameter of the through-hole of the first portion, the head portion being provided on an opposite side of the second portion with respect to the first portion to contact the first portion.

14. A bicycle disc brake rotor comprising:
an annular attachment portion having an inner serration portion defining an attachment opening;
an arm portion protruding radially outward from the annular attachment portion, the arm portion including a radially outer end provided radially outward of the annular attachment portion;
a rotor member having an annular shape and being provided radially outward of the annular attachment portion, the rotor member being coupled to the radially outer end of the arm portion;
a slit provided at the arm portion and the annular attachment portion so as to connect with the attachment opening and at least partially divide the arm portion to a first portion and a second portion, the slit extending in a radial direction of the bicycle disc brake rotor; and
a positioning mechanism configured to change a width of the slit to adjust an inner diameter of the attachment opening, the positioning mechanism being configured to change a width of the slit in a circumferential direction of the bicycle disc brake rotor to adjust an inner diameter of the attachment opening.

15. The bicycle disc brake rotor according to claim 14, wherein
the slit has a radial length defined in the radial direction, and
the width of the slit is shorter than the radial length.

16. The bicycle disc brake rotor according to claim 14, wherein
 the first portion includes a through-hole extending in a predetermined direction which is non-parallel to a radial direction of the disc brake rotor,
 the second portion includes an inner thread extending in the predetermined direction, and
 the positioning mechanism comprises an adjusting bolt including
  a shaft portion having an external thread and configured to be inserted in the through-hole of the first portion, the external thread being configured to be screwed in the inner thread of the second portion, and
  a head portion provided at an end of the shaft portion and having an outer diameter larger than an inner diameter of the through-hole of the first portion, the head portion being provided on an opposite side of the second portion with respect to the first portion to contact the first portion.

17. The bicycle disc brake rotor according to claim 16, wherein
 the predetermined direction is defined along the circumferential direction.

18. The bicycle disc brake rotor assembly according to claim 5, wherein
 the disc brake rotor further includes an annular attachment portion having the inner serration portion defining the attachment opening, and
 the biasing member is configured to push the annular attachment portion to the flange portion.

19. The bicycle disc brake rotor assembly according to claim 4, wherein
 the adjusting member is rotatably coupled to the hub shell about the rotational axis, and
 the external thread and the threaded hole are configured to convert a relative rotation between the hub shell and the adjusting member into a relative movement between the hub shell and the adjusting member in the axial direction.

20. The bicycle disc brake rotor assembly according to claim 19, wherein
 the disc brake rotor further includes an annular attachment portion having the inner serration portion defining the attachment opening, and
 the flange portion is configured to contact the annular attachment portion to transmit the relative movement to the disc brake rotor.

21. The bicycle disc brake rotor assembly according to claim 1, wherein
 the adjusting member is rotatably coupled to the hub shell about the rotational axis so that a rotation of the adjusting member relative to the hub shell about the rotational axis changes the adjusted position of the disc brake rotor relative to the hub shell in the axial direction.

22. The bicycle disc brake rotor according to claim 14, further comprising:
 a fastening member coupling the rotor member to the radially outer end of the arm portion.

23. The bicycle disc brake rotor according to claim 14, wherein
 the radially outer end of the arm portion is provided radially outward of the slit.

24. The bicycle disc brake rotor assembly according to claim 1, wherein
 the biasing member is provided substantially coaxially with the rotational axis.

* * * * *